United States Patent
Bae et al.

(10) Patent No.: US 11,449,134 B2
(45) Date of Patent: Sep. 20, 2022

(54) METHOD FOR STORING INFORMATION ON BASIS OF IMAGE ACQUIRED THROUGH CAMERA MODULE, AND ELECTRONIC DEVICE USING SAME

(71) Applicant: Samsung Electronics Co., Ltd., Suwon-si (KR)

(72) Inventors: Sujung Bae, Suwon-si (KR); Soyoung Kim, Suwon-si (KR); Heebum Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/265,141

(22) PCT Filed: Jun. 26, 2019

(86) PCT No.: PCT/KR2019/007750
§ 371 (c)(1),
(2) Date: Feb. 1, 2021

(87) PCT Pub. No.: WO2020/027442
PCT Pub. Date: Feb. 6, 2020

(65) Prior Publication Data
US 2021/0311545 A1  Oct. 7, 2021

(30) Foreign Application Priority Data
Aug. 1, 2018 (KR) .......... 10-2018-0089703

(51) Int. Cl.
*G06F 3/01* (2006.01)
*G06T 11/60* (2006.01)
(Continued)

(52) U.S. Cl.
CPC .............. *G06F 3/011* (2013.01); *G06T 11/60* (2013.01); *G06T 19/006* (2013.01); *H04N 5/77* (2013.01); *H04N 5/92* (2013.01)

(58) Field of Classification Search
CPC ........ G06F 3/011; G06T 11/60; G06T 19/006; G06T 2200/24; G06T 2210/04;
(Continued)

(56) References Cited

U.S. PATENT DOCUMENTS

2012/0047233 A1  2/2012  Jin
2012/0057032 A1  3/2012  Jang et al.
(Continued)

FOREIGN PATENT DOCUMENTS

JP  2017-107520 A  6/2017
KR  10-2012-0017870 A  2/2012
(Continued)

OTHER PUBLICATIONS

International Search Report dated Oct. 16, 2019 in connection with International Patent Application No. PCT/KR2019/007750, 2 pages.
(Continued)

*Primary Examiner* — Chong Wu

(57) ABSTRACT

An electronic device according to various embodiments comprises a display, a camera module, and a processor, wherein the processor can be configured to: acquire a first image including a specific region through the camera module; store, on the basis of the first image, information related to at least one object included in the first image; acquire, on the basis of the second image, information related to at least one object included in a second image when the camera module acquires the second image including at least a partial region of the specific region; display, through the display, together with the second image, information that matches information corresponding to the at least one object included
(Continued)

in the second image from among the pieces of information related to the at least one object included in the first image; and store, in correspondence to the at least partial region of the specific region, information which does not match the information corresponding to the at least one object included in the second image from among the pieces of information related to the at least one object included in the first image. Other additional embodiments are possible.

13 Claims, 17 Drawing Sheets

(51) Int. Cl.
*G06T 19/00* (2011.01)
*H04N 5/77* (2006.01)
*H04N 5/92* (2006.01)

(58) Field of Classification Search
CPC ...... G06T 2219/004; H04N 5/77; H04N 5/92; H04N 5/9202; H04N 5/9305
See application file for complete search history.

(56) References Cited

U.S. PATENT DOCUMENTS

| | | |
|---|---|---|
| 2012/0223966 A1 | 9/2012 | Lim |
| 2015/0310012 A1 | 10/2015 | Kim et al. |
| 2017/0169294 A1 | 6/2017 | Wang |
| 2018/0061138 A1* | 3/2018 | Neeter .................. G06T 19/00 |
| 2018/0136465 A1 | 5/2018 | Chi et al. |

FOREIGN PATENT DOCUMENTS

| | | |
|---|---|---|
| KR | 10-2012-0074669 A | 7/2012 |
| KR | 10-1260483 B1 | 5/2013 |
| KR | 10-2013-0079962 A | 7/2013 |
| KR | 10-1289085 B1 | 7/2013 |
| KR | 10-1293776 B1 | 8/2013 |
| KR | 10-2016-0128119 A | 11/2016 |
| KR | 10-2017-0062290 A | 6/2017 |

OTHER PUBLICATIONS

Written Opinion of the International Searching Authority dated Oct. 16, 2019 in connection with International Patent Application No. PCT/KR2019/007750, 5 pages.

* cited by examiner

FIG. 5A
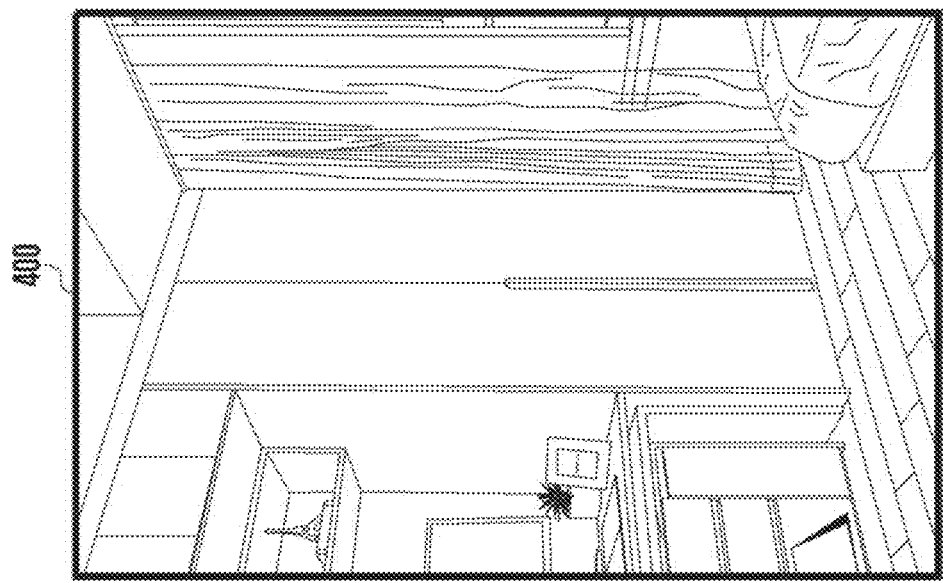
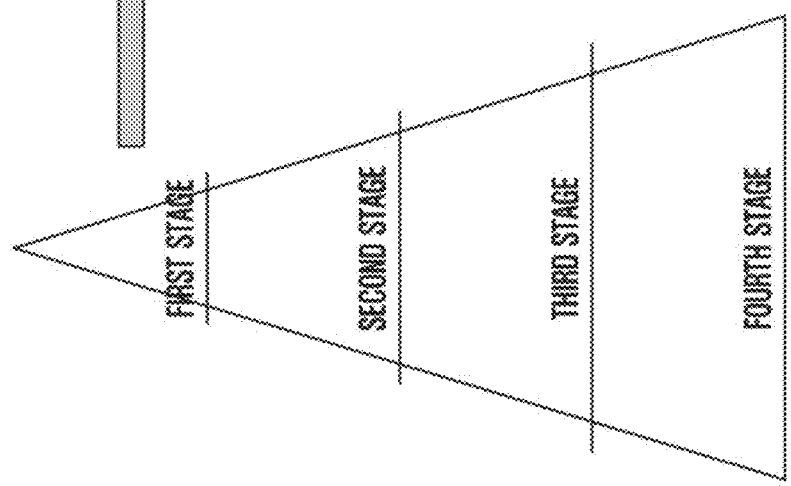

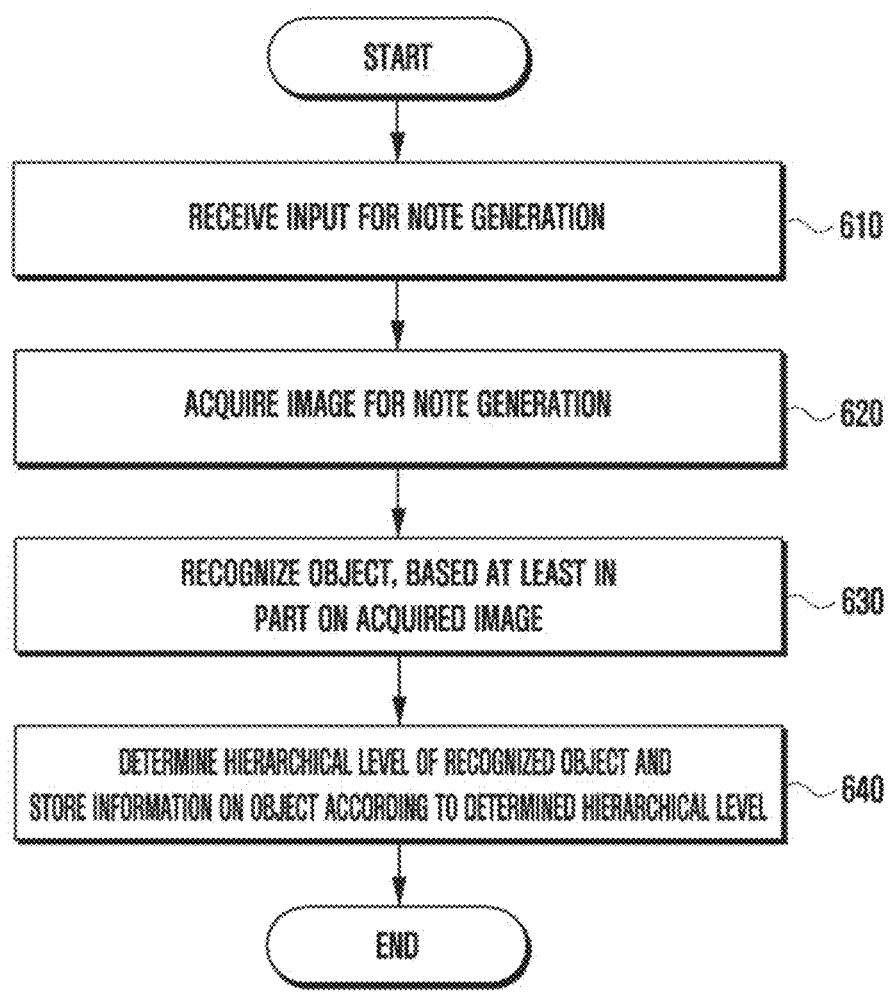

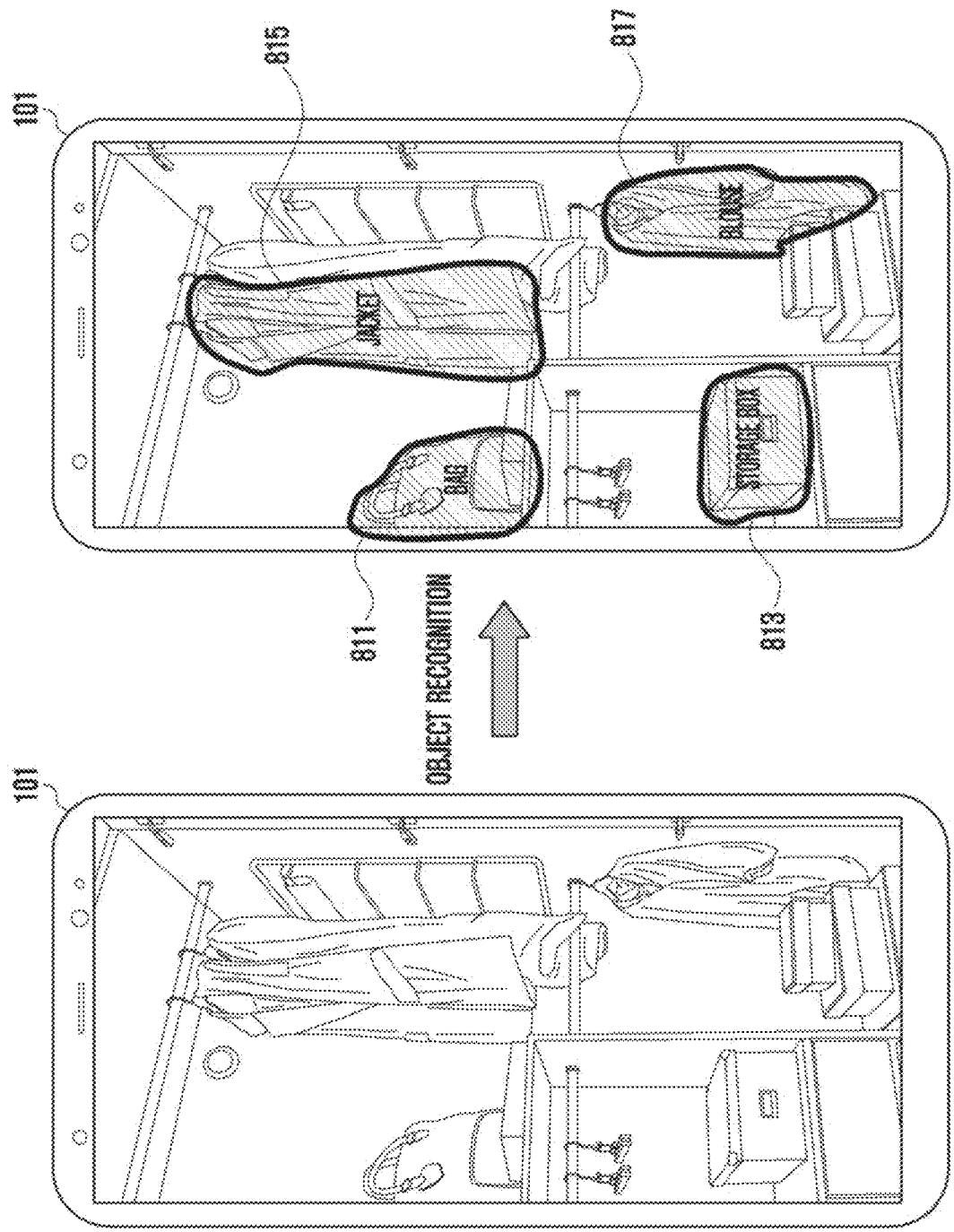

METHOD FOR STORING INFORMATION ON BASIS OF IMAGE ACQUIRED THROUGH CAMERA MODULE, AND ELECTRONIC DEVICE USING SAME

CROSS-REFERENCE TO RELATED APPLICATIONS

This application is a 371 of International Application No. PCT/KR2019/007750 filed on Jun. 26, 2019, which claims priority to Korean Patent Application No. 10-2018-0089703 filed on Aug. 1, 2018, the disclosures of which are herein incorporated by reference in their entirety.

BACKGROUND

1. Field

Various embodiments of the disclosure relate to a method for storing information based on an image acquired through a camera module, and an electronic device using the same.

2. Description of Related Art

An electronic device (e.g., a smartphone, smart glasses, etc.) may provide a new experience to a user through augmented reality (AR). For example, the electronic device may provide a single image in which a virtual object is superimposed on a real background.

A user may make a note to remember something. For example, a user may manually make a note on a note paper by using his/her hand and attach the note paper to a specific space. For another example, a user may make a note through a note application of an electronic device. When a user uses note papers, the attached note papers may look messy in appearance. When a user records an image (e.g., a moving image, a still image, a text, etc.) through a note application, it is difficult to emphasize the relevance of a corresponding note to a specific space. In the case of a general note application, notes are listed in the order of time when the notes are made, and a user may often forget a note that he/she made in the past after making the note.

In addition, when the note paper or note application is used, it is difficult to revise or update a note. In the case of using a note paper, another tool (e.g., an eraser, correction liquid, etc.) is required to be used to change the content of a note, and the revised note paper may look messy even when the note is revised. In the case of using a note application, there may be a hassle in that a user deletes a note individually through a delete button, and is required to manually re-type a note. Furthermore, it may take a considerable amount of time to hierarchically divide and store notes in a note application since the amount of data that a user is required to manually input is large. As a result, it may be difficult for a user of an electronic device to easily and conveniently store and manage a hierarchical note associated with a specific space within a short time.

SUMMARY

An electronic device according to various embodiments may include: a display; a camera module; and a processor, wherein the processor is configured to perform at least one of: acquiring a first image including at least one object disposed in a predetermined space, through the camera module; storing information on the at least one object to correspond to the predetermined space, based on the acquired first image; acquiring a second image including at least a part of the predetermined space, through the camera module; and based on the acquired second image, in a case of a first object included in the at least one object of the first image among an object included in the second image, displaying information on the first object together with the second image, through the display, and in a case of a second object which is not included in the at least one object of the first image among the object included in the second image, storing information on the second object to correspond to the predetermined space.

A method of an electronic device according to various embodiments may include performing at least one of: acquiring a first image including at least one object disposed in a predetermined space, through a camera module of the electronic device; storing information on the at least one object to correspond to the predetermined space, based on the acquired first image; acquiring a second image including at least a part of the predetermined space, through the camera module; and based on the acquired second image, in a case of a first object included in the at least one object of the first image among an object included in the second image, displaying information on the first object together with the second image, through the display, and in a case of a second object which is not included in the at least one object of the first image among the object included in the second image, storing information on the second object to correspond to the predetermined space.

According to various embodiments of the disclosure, an electronic device can provide a note function to a user through augmented reality. The user of the electronic device can make a note associated with a specific space through augmented reality. The note does not exist in a real background and may be provided to the user through the electronic device. Accordingly, the user's surrounding environment may be simpler in appearance. The user of the electronic device can easily and conveniently make a hierarchical note within a short time by using at least one of image capturing, the user's voice input, and Internet of Things (IoT) information.

The electronic device can not only simply store a captured image itself but also objectify a plurality of objects included in the image to recognize and store the same. Additionally, the electronic device can more conveniently change or update a note by using at least one of image capturing, the user's voice input, and Internet of Things information. For example, the electronic device can compare an image used in an existing note with a recently captured image through artificial intelligence (AI), and change or update the existing note only by contrasting the images. Accordingly, the user of the electronic device can easily and conveniently store a hierarchical note associated with a specific space within a short time.

The user of the electronic device can identify note information, which is intuitively and hierarchically classified, through a search, without necessarily going to the front of a corresponding note to identify the note or searching through a plurality of notes to find out a note which has necessary information. The user can perform a search by inputting information such as voice, a text, and an image into the electronic device.

BRIEF DESCRIPTION OF THE DRAWINGS

FIGS. 5A to 5D are diagrams for explaining a method for hierarchically storing a note through an image according to various embodiments of the disclosure;

FIG. 6 is a flowchart illustrating a method for generating a note through an interaction with a user by an electronic device according to various embodiments of the disclosure;

FIG. 8 illustrates a method for recognizing an object, based on at least one of sensor information and an image, in an electronic device according to various embodiments of the disclosure;

DETAILED DESCRIPTION

Figure 1:
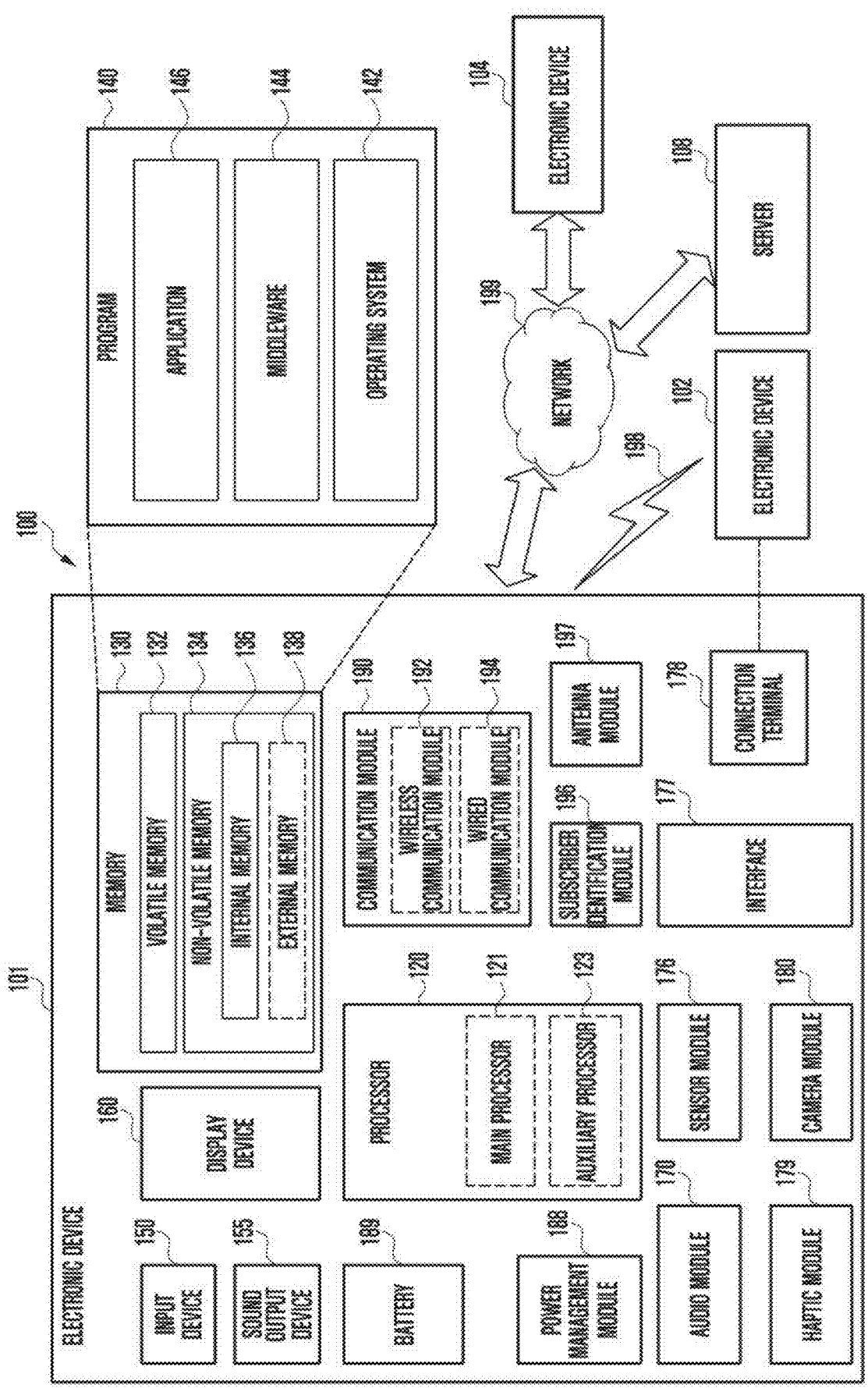
FIG. 1 is a block diagram of an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. The camera module 180 may be one or more modules for acquiring different signals such as RGB, IR, and time of flight (TOF), and may be a combination thereof. For example, the camera module 180 may be in the form of a stereo camera for acquiring two RGB images or may be a stereo camera in which RGB and TOF are combined.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
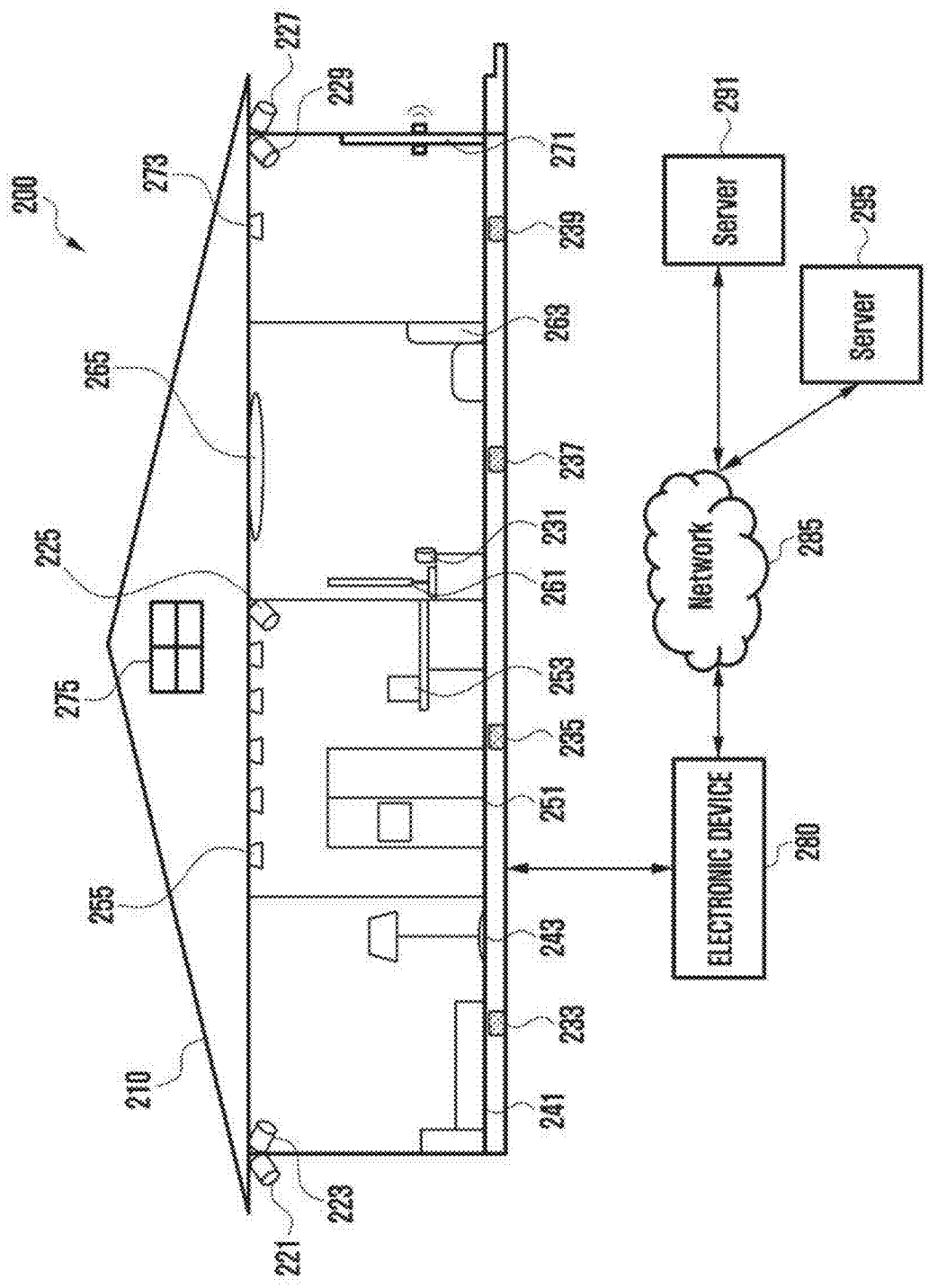
FIG. 2 illustrates a smart home environment according to various embodiments of the disclosure.

FIG. 2 illustrates a smart home environment according to various embodiments of the disclosure.

According to various embodiments, FIG. 2 illustrates a smart home environment 200.

According to various embodiments, the smart home environment may include: one or more cameras 221, 223, 225, 227, 229, or 231, one or more sensors or devices (e.g., a floor microphone 233, 235, 237, or 239) including sensors, master bedroom objects (a bed 241 and a lamp 243), kitchen objects (a refrigerator 251, a coffee machine 253, and a light 255), living room objects (a TV 261, a sofa 263, and a light 265), front door objects (a door 271 and a light 273), a window 275, an electronic device 280 (e.g., the electronic device 101 of FIG. 1), a network 285 (e.g., the network 199 of FIG. 1), and one or more external servers 291 and 295 (e.g., the server 108 of FIG. 1). For example, the electronic device 280 may correspond to an artificial intelligence speaker. Alternatively, the electronic device may include an electronic device which controls an artificial intelligence speaker or interworks with the artificial intelligence speaker.

According to various embodiments, the electronic device 280 may detect a location of a person by using at least one of the one or more cameras 221 to 231. For example, the electronic device 280 may detect a person entering or leaving a house through a door, through the camera 227.

Alternatively, the electronic device 280 may detect a person entering, leaving, or staying in a designated location (e.g., a master bedroom, a kitchen, a living room, or a front door), through the cameras 223, 225, 229, and 231. According to another embodiment, the electronic device 280 may detect a person stalking around a house or invading the house, through the camera 221. In addition, the electronic device 280 may identify a user by using at least one of the one or more cameras 221 to 231. For example, the electronic device 280 may identify whether the person is a designated person (e.g., a resident) or an undesignated person (e.g., an intruder or a guest).

According to various embodiments, the electronic device 280 may detect a location of a person, through a plurality of floor microphones 233 to 239. For example, the electronic device 280 may determine that a person is in the master bedroom, based on sound of footsteps acquired by the floor microphone 233. In addition, the electronic device 280 may use features (e.g., an intensity, a pattern, a frequency, etc.) of the sound of the footsteps acquired by the floor microphone 233, so as to compare the features with pre-acquired features of a person's gait and identify a person. For example, when assuming a family composed of a father, a mother, and a child, the electronic device 280 may determine that a person is a father if the volume of sound of footsteps is the loudest and a time interval between steps is about 1 to 2 seconds. The electronic device 280 may determine that a person is a mother if the volume of sound of footsteps is medium and a time interval between steps is about 2 to 3 seconds. The electronic device 280 may determine that a person is a child if the volume of sound of footsteps is small and a time interval between steps is about 1 to 2 seconds. For example, the electronic device may distinguish a person by using various features such as a distance interval between steps, a feature of going from a left foot to a right foot, and a feature of going from a right foot to a left foot. For example, when an unlearned footstep feature or a designated footstep feature is acquired, the electronic device 280 may determine that an intruder may have intruded.

According to various embodiments, the electronic device 280 may determine a location of a person by using the plurality of floor microphones. For example, the electronic device 280 may calculate a distance from the floor microphones 233, 235, and 237 by using a triangulation method through the floor microphones 233, 235, and 237, so as to determine a location of a person in more detail. For example, the electronic device 280 may determine which of the TV 261 or the sofa 263 a person approaches or is located closer to in the living room. Alternatively, the electronic device 280 may determine which of the refrigerator 251 or the coffee machine 253 a person approaches or is located closer to in the kitchen. Alternatively, the electronic device 280 may determine a direction in which a person moves from the kitchen to the master bedroom and from the kitchen to the living room. According to an embodiment, a floor microphone is used as an example, but a microphone may exist in various objects. For example, a microphone may exist in various places such as a ceiling-mounted type microphone, a lighting-mounted type microphone, a furniture-mounted type microphone, and a home appliance-mounted type microphone.

According to various embodiments, the electronic device 280 may determine a location of a user, based on information received from various objects such as the bed 241, the lamp 243, the refrigerator 251, the coffee machine 253, the TV 261, the sofa 263, and the like.

According to various embodiments, the bed 241 or the sofa 263 may include at least one of a motion sensor, a weight sensor, an acceleration sensor, a capacitance sensor, and a pressure sensor. The lamp 243 may include a motion sensor and provide on/off information of the lamp 243. The refrigerator 251 may include a motion sensor, a camera, a door open sensor, an acceleration sensor, and the like, and provide opening/closing information of a door, information on an object which is to be put in or removed, and the like. The coffee machine 253 may include a motion sensor and provide on/off information of the coffee machine 253, information on the type of coffee, information on a coffee temperature, and the like. The lights 255, 265, and 273 may include a motion sensor and provide on/off information of the lights 255, 265, and 273. The TV 261 may include a motion sensor, a camera, and a microphone and provide on/off information of the TV 261, content use information, and the like. The door 271 or the window 275 may include a motion sensor, an acceleration sensor, a door open sensor, a biometric information sensor, and the like, and provide opening/closing information, entry and exit information of an object, outside intrusion information, and the like.

According to various embodiments, one or more sensors or devices including sensors may include a wireless communication device, and receive a wireless signal received from a portable electronic device (e.g., a mobile phone, a smart bracelet, etc.) of a user to provide information on the received signal.

According to various embodiments, the electronic device 280 may determine a location of a user by using various provided information, and identify the user. The electronic device 280 may determine a location of a user, through various provided information, by using the server 291, and identify the user. In addition, the electronic device 280 may provide various provided information to the server 291.

According to various embodiments, the electronic device 280 may determine the setting of a sensor by using additional information such as electronic equipment which is currently operating, a current time, and a learned life pattern of a user. For example, the electronic device 280 may determine that a user is sleeping if the user is in the master bedroom, the light is off, and the user is determined, through a sensor of the bed, as lying down for a designated time or longer. The electronic device 280 may determine the setting of the sensor as a sleep setting (e.g., once about every 20 minutes in early evening and once about every 5 minutes in early morning).

According to various embodiments, the electronic device 280 may determine the type of sensor to perform sensing among sensors related to the master bedroom. The electronic device 280 may determine the type of sensor to perform sensing, by using additional information such as electronic equipment which is currently operating, a time, and a learned life pattern of a user. For example, the electronic device 280 may also apply a sleep setting to the kitchen and the living room. In addition, during the sleep setting, the living room and the kitchen may be configured as a monitoring setting. Only one of a camera and a motion sensor may be configured to perform sensing.

According to various embodiments, the electronic device 280 may include a portable terminal, a tablet, or a wearable electronic device of a user. Alternatively, the electronic device 280 may be included in various electronic devices such as a TV, a refrigerator, a set-top box, and a game machine. In addition, for convenience of description, an example in which the electronic device 280 is separately configured has been illustrated, but functions of the electronic device 280 may be included in each of or at least one of various objects or electronic devices.

According to various embodiments, FIG. 2 illustrates an operation of an electronic device (e.g., an artificial intelligence speaker) in a smart home environment, but this is not limited to a smart home and can be applied even in various environments (e.g., inside a building, outdoors, or the like). In addition, although the artificial intelligence speaker is mentioned, the electronic device may include various electronic devices which are not restricted to the term artificial intelligence. In addition, the servers 291 and 295 of FIG. 2 may correspond to the server 108 of FIG. 1, and the network 285 may correspond to the network 199 of FIG. 1.

According to various embodiments, in the smart home environment, a user may interact with at least one electronic device to generate, search for, and output a note. The user may communicate with an electronic device by using a voice input and a graphic user interface (GUI), and use a camera of an electronic device (e.g., a smartphone, a smart TV, a security camera, a refrigerator, etc.) located in the smart home environment in order to acquire image information. In addition, an electronic device such as a mini robot may supplement the user's movement. In a situation where the user does not carry an electronic device such as a smartphone, the user may input or acquire at least one piece of information through the mini robot. The interaction with the mini robot may be mainly made by a voice input, and image information to be used for generating and updating a note may be acquired using a camera mounted on the mini robot.

Information generated by a user may be stored in an electronic device such as a smartphone, or may be stored in an artificial intelligence hub device (e.g., an artificial intelligence speaker) in the smart home environment. In this case, the information may be stored in a secure area of the artificial intelligence hub device. The artificial intelligence hub device may supplement insufficient computing resources of a smartphone and a mini robot, and include a recognition model required for voice recognition and image recognition, so as to perform a recognition function using the recognition model. A recognition result of the artificial intelligence hub device (e.g., the electronic device 280 of FIG. 2) may be transmitted to an electronic device included in the smart home environment, such as a smartphone and a mini robot. Meanwhile, the recognition model may be updated through an external server (e.g., a cloud server, and the servers 291 and 295 of FIG. 2). The voice and image recognition functions may be performed by the external server. In this case, a recognition result may be transmitted to the user's smart device or IoT devices in a house through the artificial intelligence hub device. Alternatively, the recognition result may be directly transmitted to the user's smart device or IoT devices without the artificial intelligence hub device.

Figure 3:
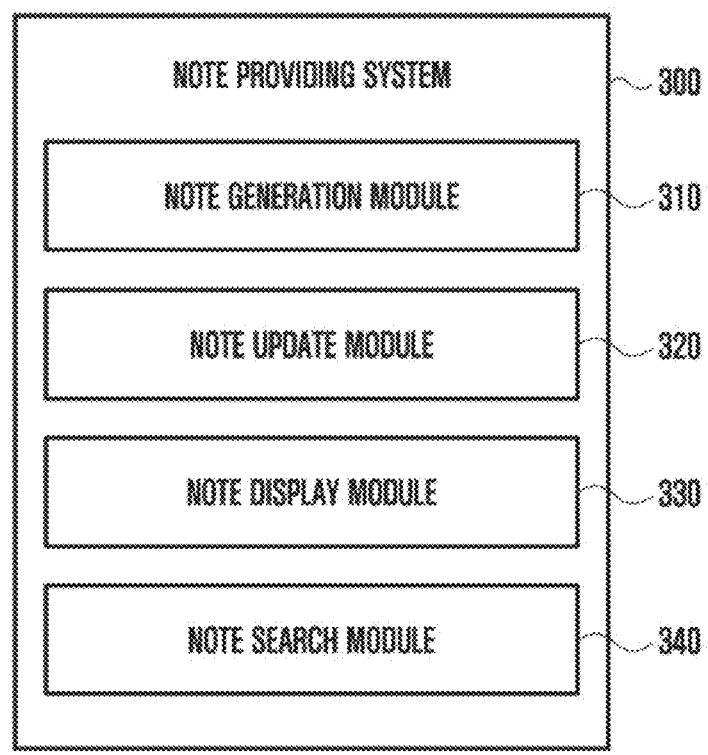
FIG. 3 is a block diagram schematically showing a note providing system according to various embodiments of the disclosure.

FIG. 3 is a block diagram schematically showing a note providing system according to various embodiments of the disclosure.

According to various embodiments, the electronic device 101 may generate, update, search for, and display a note through a note providing system 300. For example, the note providing system 300 may include a note generation module 310, a note update module 320, a note display module 330, and a note search module 340.

According to various embodiments, the note generation module 310 may generate a note, based on information such as a user's voice input and an image. In this case, the image may include a moving image or a still image. For example, the user may input start and end of note generation, information on an object to be included in a note, and the like by voice. For example, the note generation module 310 may use a camera of an electronic device (e.g., a smartphone, a smart TV, a security camera, a refrigerator, etc.) located in a smart home environment in order to acquire image information. The note generation module 310 may recognize an object included in the acquired image to acquire at least one piece of information on the object (e.g., an object area, an object category, an object image, an object hierarchy, etc.). Accordingly, the note generation module 310 may generate a note, based on automatically recognized information even when a user of the electronic device 101 does not manually record note contents one by one. The note generation module 310 may hierarchically classify and store the recognized object. For example, the note generation module may include and store hierarchical information such as information on a room in which a specific object is located, a piece of furniture in which a specific object is located, and a box in which a specific object is located.

According to various embodiments, the note generation module 310 may generate a note using augmented reality. For example, the note generation module 310 may generate an augmented reality note by selecting a note available area and a note content (e.g., an object recognized in an image) corresponding to the note available area. The selection may be performed sequentially or individually, and performed by using drag input, tap touch input, or the like. The specific content relating thereto may be described with reference to FIG. 8B.

According to various embodiments, the note update module 320 may update a note, based on information such as a user's voice input and a captured image. For example, the user may input start and end of note update, information on an object to be updated in a note, and the like by voice. For example, the note update module 320 may use a camera of an electronic device (e.g., a smartphone, a smart TV, a security camera, a refrigerator, etc.) located in a smart home environment in order to acquire image information. The note update module 320 may recognize an object included in the acquired image to acquire at least one piece of information on the object (e.g., an object area, an object category, an object image, an object hierarchy, etc.). The note update module 320 may acquire a new image in relation to a note to be updated. The note update module 320 may compare object information included in a pre-stored note with object information included in a newly acquired image, and identify and store at least one change. The note update module 320 may automatically extract an area of an object through object recognition technology, and recognize a category of the object. Accordingly, the user may update a note through automatically recognized object information, even without manually inputting and classifying the content of the object.

According to various embodiments, the note display module 330 may provide at least one stored note to a user. For example, at least one note may be stored in the user's smartphone (e.g., the electronic device 101 of FIG. 1), and combined with a specific area through augmented reality and displayed. The augmented reality may refer to a technology which provides information as augmentation, based on reality. For example, virtual reality displays all of an image, a surrounding background, and an object as a virtual image, while the augmented reality can make only additional information virtual and provide the same to the user. In other words, the augmented reality differs from the virtual reality in that the augmented reality is based on an actual appearance of the actual world.

For another example, at least one note may be stored in an artificial intelligence hub device in a smart home rather than a smartphone of a user, and when the user activates an augmented reality note function, the at least one note may be transferred from the artificial intelligence hub device to the smartphone and displayed. The note display module 330 may recognize a virtual area in which a note is to be displayed in an image acquired using the camera module 180. For example, the note display module 330 may acquire a depth map from the image acquired using the camera module 180, and identify depth information of an object included in the image, based on the depth map. The note display module 330 may acquire information on a plane to display an augmented reality note, based on the depth information.

The note display module 330 may determine the acquired plane information as a note available area, and display, as augmented reality, information (e.g., an object image, an object name, an object type, an object category, an object hierarchy, etc.) corresponding to a note of a user on the selected plane. When a plurality of objects to be displayed exist in a specific area (e.g., a closet), the note display module 330 may first provide an image representing the specific area to the user. Thereafter, when the user selects the corresponding representative image, the note display module may display information on the plurality of objects included in the specific area in detail. In this case, the representative image may include an image of an object directly designated by the user, an image of an object of which a change is recently detected, or an image of an object which has been placed for the longest time.

According to various embodiments, the note search module 340 may search for a pre-stored note, based on information such as a user's voice input and a captured image. The note search module 340 may use a tree structure stored in the note providing system 300 to search for hierarchical information of an object to be searched for. The note search module 340 may search for a note by using at least one piece of information (e.g., location information, image information, etc.) from other IoT devices in the smart home environment.

Figure 4:
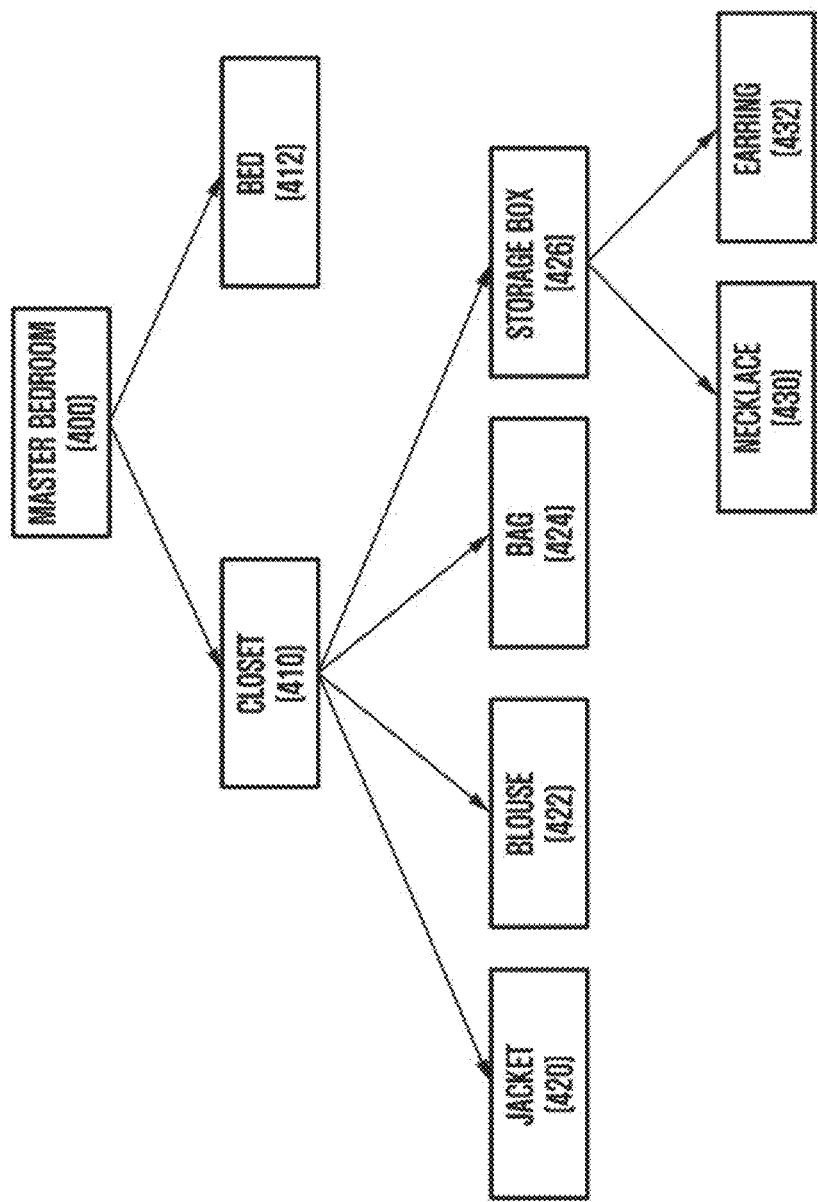
FIG. 4 illustrates an example of hierarchically classifying information on a specific space in which a user intends to make a note according to various embodiments of the disclosure.

FIG. 4 illustrates an example of hierarchically classifying information on a specific space in which a user intends to make a note according to various embodiments of the disclosure.

According to various embodiments, the electronic device 101 may hierarchically classify and store a plurality of objects (e.g., reference numerals 400 to 432) to be included in a note. At least one of image and voice input may be used to minimize a user's effort required to hierarchize a note content. According to an embodiment, a category having a wider relation may be configured as an upper layer by using an inclusion relation at the time of hierarchization, and note information may be stored using a hierarchical diagram (e.g., a tree structure). For example, a master bedroom 400 may include a closet 410 and a bed 412. The closet 410 may include a jacket 420, a blouse 422, a bag 424, and a storage box 426. The storage box 426 may include a necklace 430 and an earring 432. The level or depth of hierarchization may be differently configured according to a user's need or a determination based on artificial intelligence of the electronic device. A specific object may be hierarchized into a larger number of levels than other objects, or may be simply classified in one or two stages. The hierarchical information of the objects disclosed in FIG. 4 will be described in more detail in FIGS. 5A to 5D below.

FIGS. 5A to 5D are diagrams for explaining a method for hierarchically storing a note through an image according to various embodiments of the disclosure.

According to various embodiments, FIG. 5A may indicate a first stage in a hierarchical structure of a note. For example, the electronic device 101 may acquire an image of the master bedroom 400 by using the camera module 180, and configure a "master bedroom" as information of the first stage, based on image recognition for the acquired image. For another example, the electronic device 101 may store a hierarchical note, based on receiving a voice input relating to a note of a user. Based on a voice input of "This is my master bedroom" from the user, the electronic device 101 may configure the "master bedroom" as information of the first stage.

Figure 5B:
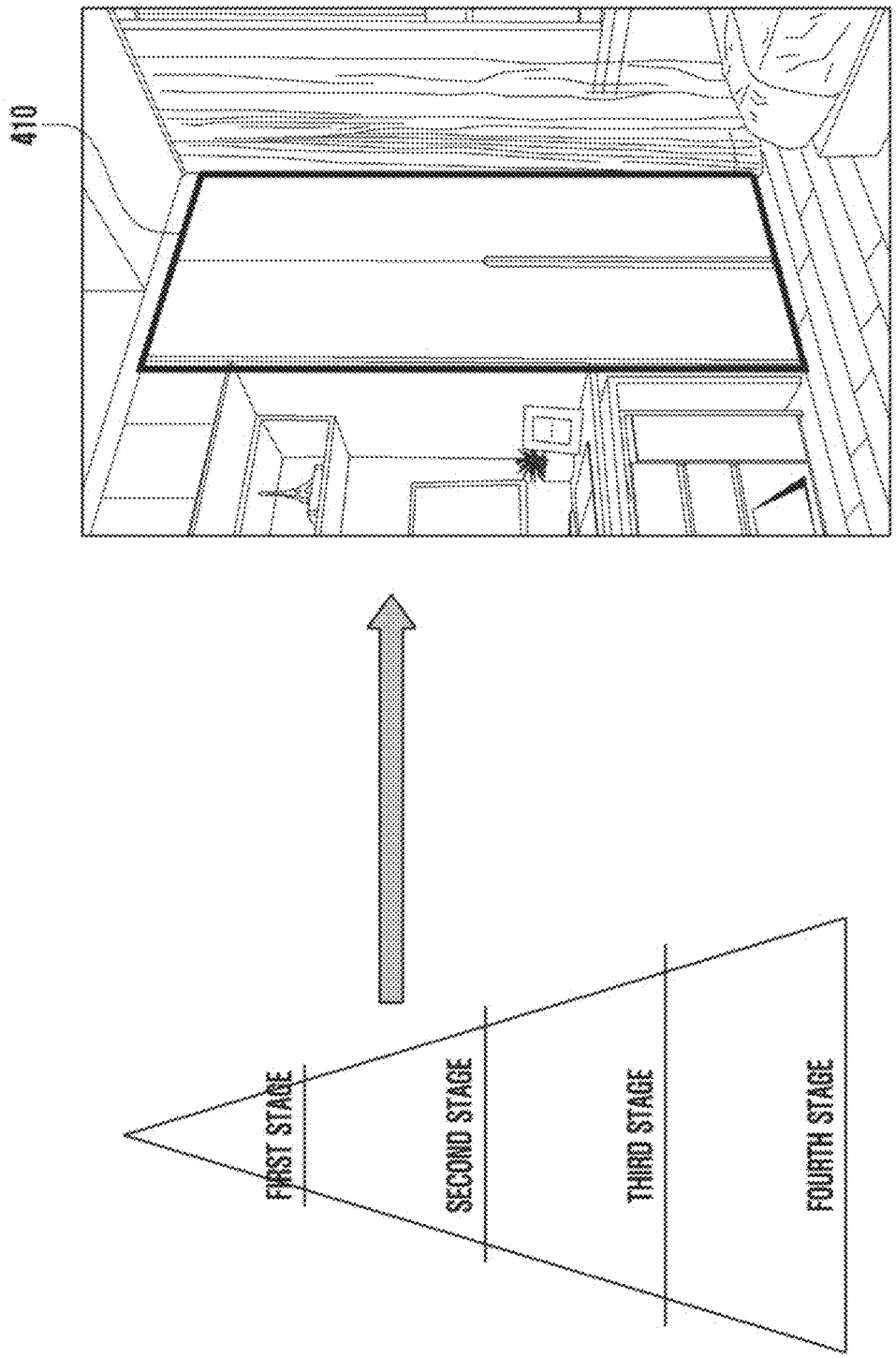

According to various embodiments, FIG. 5B may indicate a second stage in a hierarchical structure of a note. For example, a user may acquire an image of the closet 410 by using the camera module 180 of the electronic device 101, and configure a "closet" as information of the second stage, based on image recognition for the acquired image. For another example, the electronic device 101 may store a hierarchical note, based on receiving a voice input relating to a note of the user. Based on a voice input of "The furniture over there is a closet" from the user, the electronic device 101 may configure the "closet" as information of the second stage.

Figure 5C:
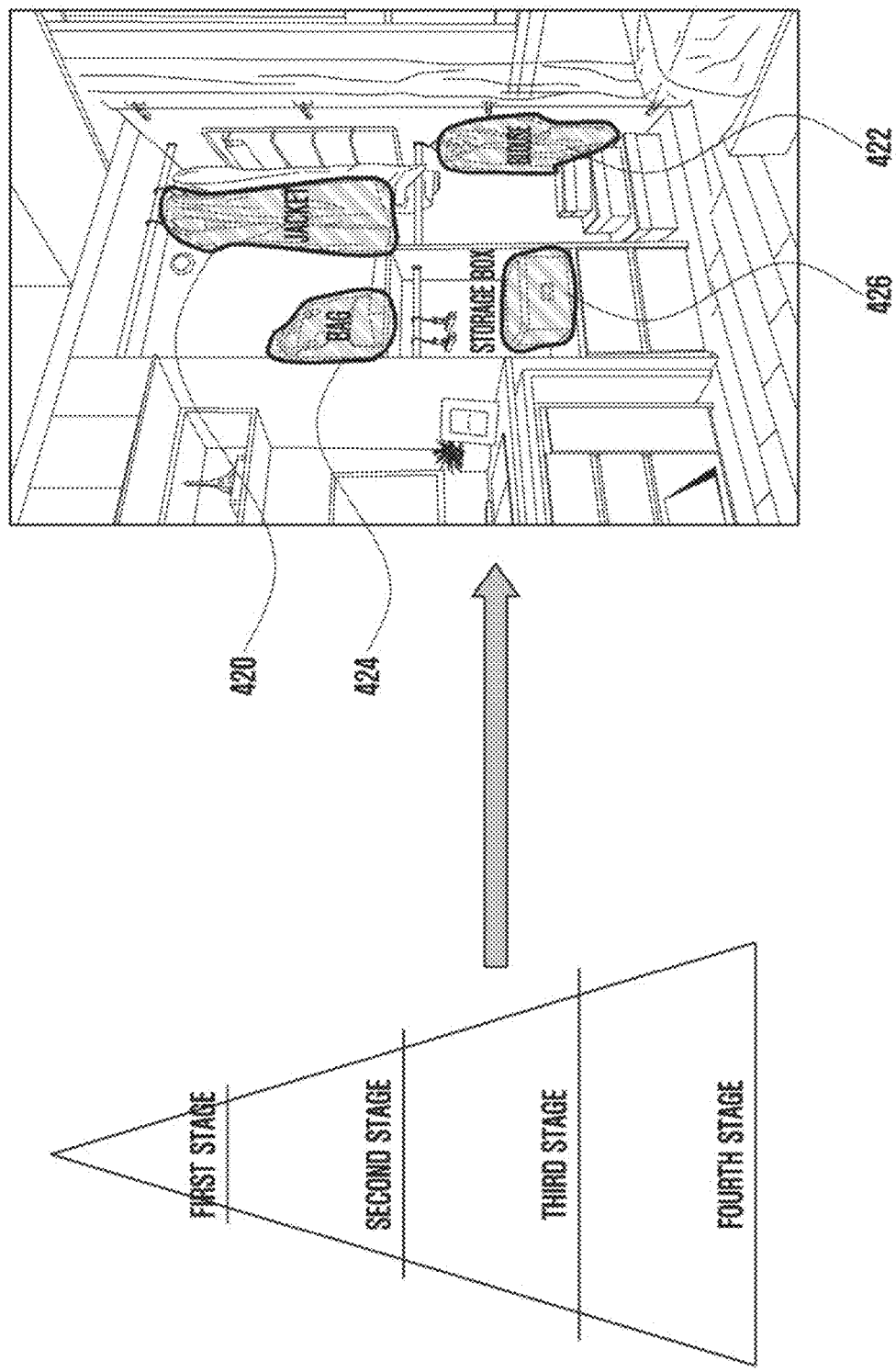

According to various embodiments, FIG. 5C may indicate a third stage in a hierarchical structure of a note. For example, a user may use the camera module 180 of the electronic device 101 to acquire an image of at least one object (e.g., the jacket 420, blouse 422, bag 424, and storage box 426) included inside the closet 410, and configure a "jacket", "blouse", "bag", and "storage box" as information of the third stage, based on image recognition for the acquired image. For another example, the electronic device 101 may store a hierarchical note, based on receiving a voice input relating to a note of the user. Based on a voice input of "There are a jacket, a blouse, a bag, and a storage box in the closet" from the user, the electronic device 101 may configure the "jacket", "blouse", "bag", and "storage box" as information of the third stage.

Figure 5D:
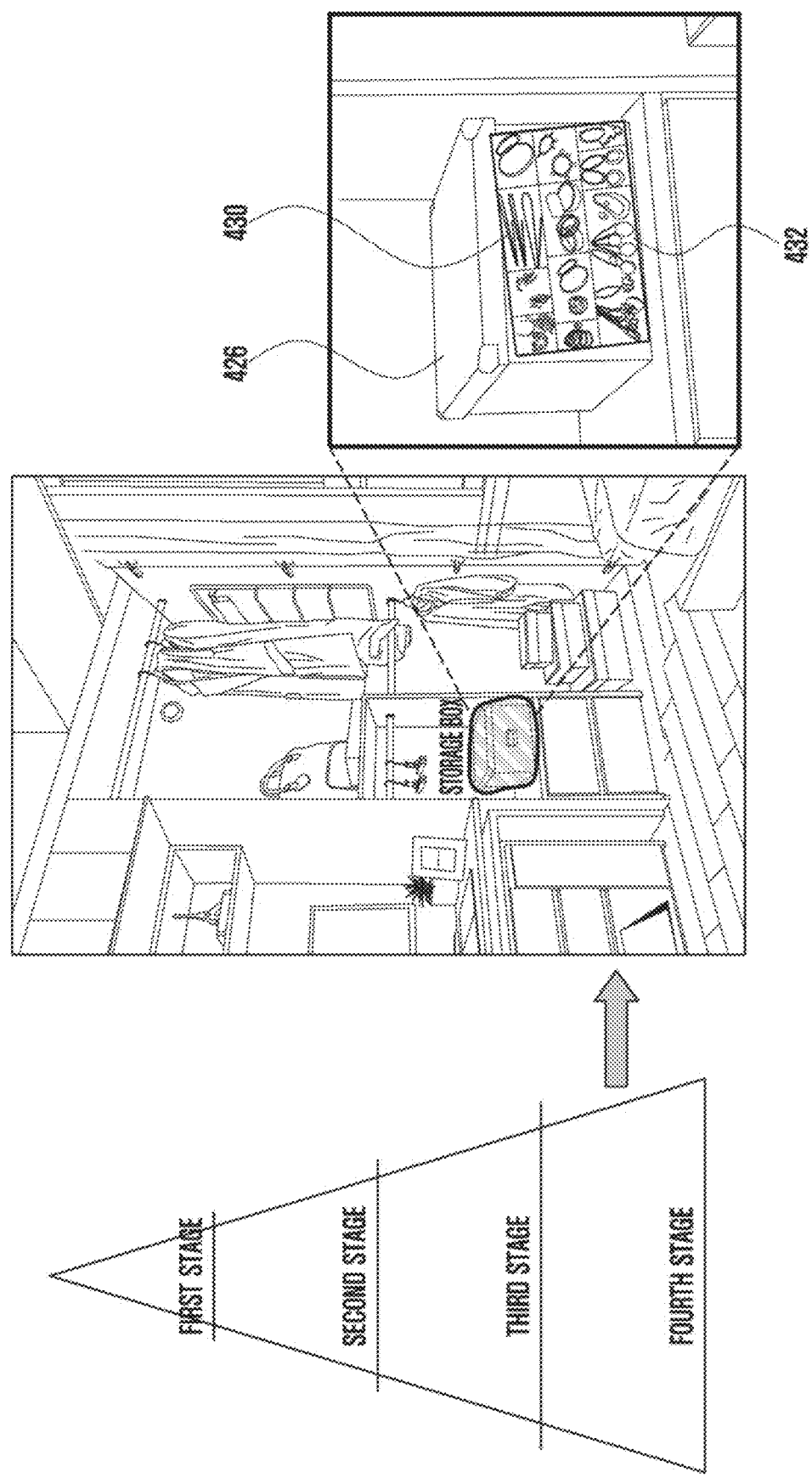

According to various embodiments, FIG. 5D may indicate a fourth stage in a hierarchical structure of a note. For example, a user may use the camera module 180 of the electronic device 101 to acquire an image of at least one accessory (e.g., the necklace 430 and earring 432) included inside the storage box 426, and configure a "necklace" and "earring" as information of the fourth stage, based on image recognition for the acquired image. For another example, the electronic device 101 may store a hierarchical note, based on receiving a voice input relating to a note of the user. Based on a voice input of "There are a necklace and an earring in the storage box" from the user, the electronic device 101 may configure the "necklace" and "earring" as information of the fourth stage.

According to various embodiments, in the embodiments of FIGS. 5A to 5D, the electronic device 101 may store a note which meets an intention of a user by combining at least a part of an image and a voice input.

According to various embodiments, a user of the electronic device 101 may conveniently identify information of any node in a note stored in a hierarchical structure, through a search function. In addition, through the hierarchical structure, not only a corresponding node but also information of an upper layer may be acquired together, so that the quality and quantity of information that the user can learn may be much more abundant. For example, the electronic device 101 may receive a voice command of "Let me know where my earrings are" from the user. In response to such a voice command, the electronic device 101 may provide, to the user, a response of "Your earrings are in the storage box in the closet in the master bedroom". The user of the electronic device 101 may additionally acquire information of a desired level according to his/her needs by using the hierarchical structure. For example, the user of the electronic device 101 may acquire more detailed and systematic information while gradually moving note information from an upper level to a lower level.

FIG. 6 is a flowchart illustrating a method for generating a note through an interaction with a user by an electronic device according to various embodiments of the disclosure.

According to various embodiments, in operation 610, the electronic device 101 may receive an input (e.g., a voice input, a touch input, a button input, etc.) for note generation from a user. For example, the electronic device 101 may receive a voice command of "Bixby, I'm going to start making a note" from the user.

According to various embodiments, in operation 620, the electronic device 101 may acquire an image for note generation. The electronic device 101 may activate at least one component, module, and the like required for generating a note, in response to the user's input to start generating a note. For example, the electronic device 101 may activate a camera module, a voice recognition module, an image recognition module, and the like.

According to various embodiments, in operation 630, the electronic device 101 may recognize an object, based at least in part on the acquired image. The electronic device 101 may segment at least one object included in the corresponding image and recognize the corresponding object through the image recognition module.

According to various embodiments, in operation 630, the electronic device 101 may recognize an object by receiving at least one piece of information on a note being recorded, in addition to acquiring an image from the camera module.

According to various embodiments, at least one piece of the information on the note being recorded may be a voice input of the user. The electronic device 101 may recognize an object, based on the voice input of the user and the image acquired from the camera module. For example, the electronic device 101 may receive a voice input of "This is my master bedroom, and the thing over there is a closet" from the user. The user of the electronic device 101 may control the electronic device 101 to face in the direction of the closet in the master bedroom, with the corresponding voice input. The electronic device 101 may acquire an image through the camera module 180, and recognize at least one object (e.g., a master bedroom and a closet placed in the master bedroom) from the acquired image.

For another example, the electronic device 101 may receive a voice command of "There are these things when you open the closet door" from the user. In response to receiving the voice command, the electronic device 101 may acquire an image through the camera module 180, and recognize at least one object included in the closet from the acquired image. For another example, the electronic device 101 may receive a voice command of "That storage box is a box for storing accessories, and the box contains these things" from the user. In response to receiving the voice command, the electronic device 101 may acquire an image through the camera module 180, recognize at least one object included in the closet from the acquired image, and identify that at least one recognized object corresponds to an accessory.

According to various embodiments, at least one piece of information on a note being recorded may be object information of an IoT device. The electronic device 101 may belong to a smart home environment and receive object information from at least one IoT device included in the smart home environment. The electronic device 101 may recognize an object by receiving information on a location at which an image is captured and at least one object included in the image.

According to various embodiments, in operation 640, the electronic device 101 may determine a hierarchical level (level of hierarchy) of the recognized object, and store information on the recognized object according to the determined hierarchical level. The electronic device 101 may recognize the closet located in the master bedroom, based at least in part on the user's voice input, the object information of the IoT device, and the image acquired from the camera module. For example, the electronic device 101 may determine the master bedroom as a first layer entity (e.g., a room type) and the closet as a second layer entity (e.g., a piece of furniture placed in a room), and store information on the recognized object in the determined layer entity.

For another example, the electronic device 101 may store at least one object included in the closet as a third layer entity. The electronic device 101 may determine a jacket, a blouse, a bag, and a storage box in the closet as the third layer entity which is a lower layer entity than the closet which is the second layer entity, and store information on the recognized object in the determined layer entity. For another example, the electronic device 101 may store at least one object included in the storage box as a fourth layer entity. The electronic device 101 may determine a necklace and an earring in the storage box as the fourth layer entity which is a lower layer entity than the storage box which is the third layer entity, and store information on the recognized object in the determined layer entity.

Figure 7:
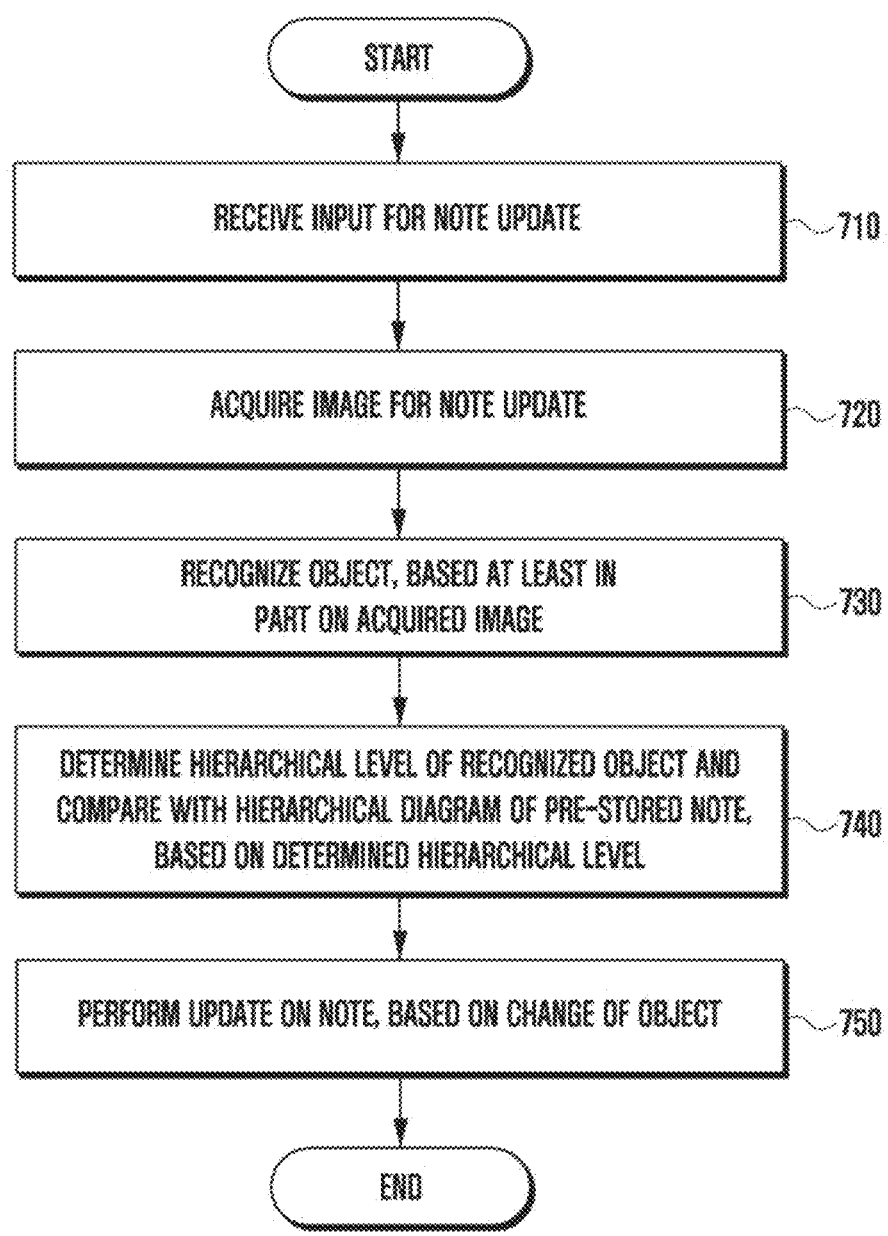
FIG. 7 is a flowchart illustrating a method for updating a note through an interaction with a user by an electronic device according to various embodiments of the disclosure.

FIG. 7 is a flowchart illustrating a method for updating a note through an interaction with a user by an electronic device according to various embodiments of the disclosure.

According to various embodiments, in operation 710, the electronic device 101 may receive an input (e.g., a voice input, a touch input, a button input, etc.) for note update. For example, the electronic device 101 may receive a voice command of "Bixby, if there are any changes, please update" from a user.

According to various embodiments, in operation 720, the electronic device 101 may acquire an image for note update. The electronic device 101 may activate at least one component, module, and the like required for updating a note, in response to the user's input to start updating a note. For example, the electronic device 101 may activate a camera module, a voice recognition module, an image recognition module, and the like.

According to various embodiments, in operation 730, the electronic device 101 may recognize an object, based at least in part on the acquired image. The electronic device 101 may segment at least one object from the corresponding image and recognize the corresponding object through the image recognition module.

According to various embodiments, in operation 730, the electronic device 101 may recognize an object by receiving at least one piece of information on a note being updated, in addition to acquiring an image from the camera module.

According to various embodiments, at least one piece of the information on the note being updated may be a voice input of the user. The electronic device 101 may recognize an object, based on the voice input of the user and the image acquired from the camera module. For example, the electronic device 101 may receive a voice input of "Let me open the closet in the master room" from the user. In response to receiving the voice input, the electronic device 101 may acquire an image through the camera module 180, and recognize at least one object included in the closet from the acquired image.

According to various embodiments, at least one piece of the information on the note being updated may be object information of an IoT device. The electronic device 101 may belong to a smart home environment and receive object information from at least one IoT device included in the smart home environment. The electronic device 101 may recognize an object by receiving information on a location at which an image is captured and at least one object included in the image.

According to various embodiments, in operation 740, the electronic device 101 may determine a hierarchical level of the recognized object. The electronic device 101 may recognize the closet located in the master bedroom, based at least in part on the user's voice input, the object information of the IoT device, and the image acquired from the camera module. For example, the electronic device 101 may determine the master bedroom as a first layer entity (e.g., a room type) and the closet as a second layer entity (e.g., a piece of furniture placed in a room).

According to various embodiments, in operation 740, the electronic device 101 may identify, based on the determined hierarchical level of the object, a hierarchical level (e.g., a node) to which an object included in the currently acquired image corresponds in a hierarchical diagram (e.g., a tree structure) of a pre-stored note. For example, the electronic device 101 may identify a change by comparing objects included in an image stored to correspond to a corresponding node and the image currently acquired through the camera module 180.

According to various embodiments, in operation 750, the electronic device 101 may transfer, to the user, information on an object to be added to a note and an object to be deleted from the note. For example, the electronic device 101 may inquire of the user, "There is no bag or storage box. Did you put them in another place?", and also inquire, "A skirt has been added. Would you like to update this?".

According to various embodiments, in operation 750, the electronic device 101 may receive a voice input of the user and receive feedback required for note update. For example, in response to the question about whether the bag and storage box were put in another place, the electronic device 101 may receive a response from the user, "Yes, I threw away the bag and moved the storage box to the desk in the small room." Upon receiving the user's response, the electronic device 101 may delete the bag from the note (e.g., a third layer entity), and change the tree structure into a new structure in which the storage box is placed on the desk in the small room, and store the changed tree structure. If note information related to the small room has not been previously generated, the electronic device 101 may generate a node relating to the small room at the same level as the master bedroom, and add the desk as a lower level for the small room. Lastly, the electronic device may store the storage box as a lower level for the desk.

According to various embodiments, in operation 750, the electronic device 101 may update a note without an explicit request from the user. For example, the electronic device may perform note update by comparing image information included in the automatically pre-stored note, based on an image acquired while the user photographs another area through the camera module. Alternatively, at least one piece of image information may be acquired from IoT devices located in the smart home environment, and the note update may be automatically performed through an artificial intelligence hub device. The electronic device 101 may notify automatically detected changes of the note, and inquire of the user whether to update the corresponding changes. Thereafter, the electronic device 101 may complete the note update by receiving an update approval input from the user. The electronic device 101 may automatically perform the note update without the user's update approval input.

FIG. 8 illustrates a method for recognizing an object, based on at least one of sensor information and an image, in an electronic device according to various embodiments of the disclosure.

According to various embodiments, referring to FIG. 8, the electronic device 101 may automatically detect areas of objects 811 to 817 through object recognition technology, and recognize categories (e.g., a bag, a jacket, a storage box, a blouse, etc.) of the objects 811 to 817. The electronic device 101 may determine a hierarchical level of the recognized object, and store information on the recognized object according to the determined hierarchical level. Accordingly, even when a user of the electronic device 101 does not manually input and classify the content of an object, the user can simply and conveniently store, update, and search for a note through automatically recognized object information (e.g., a category, hierarchy, etc.).

Figure 9A:
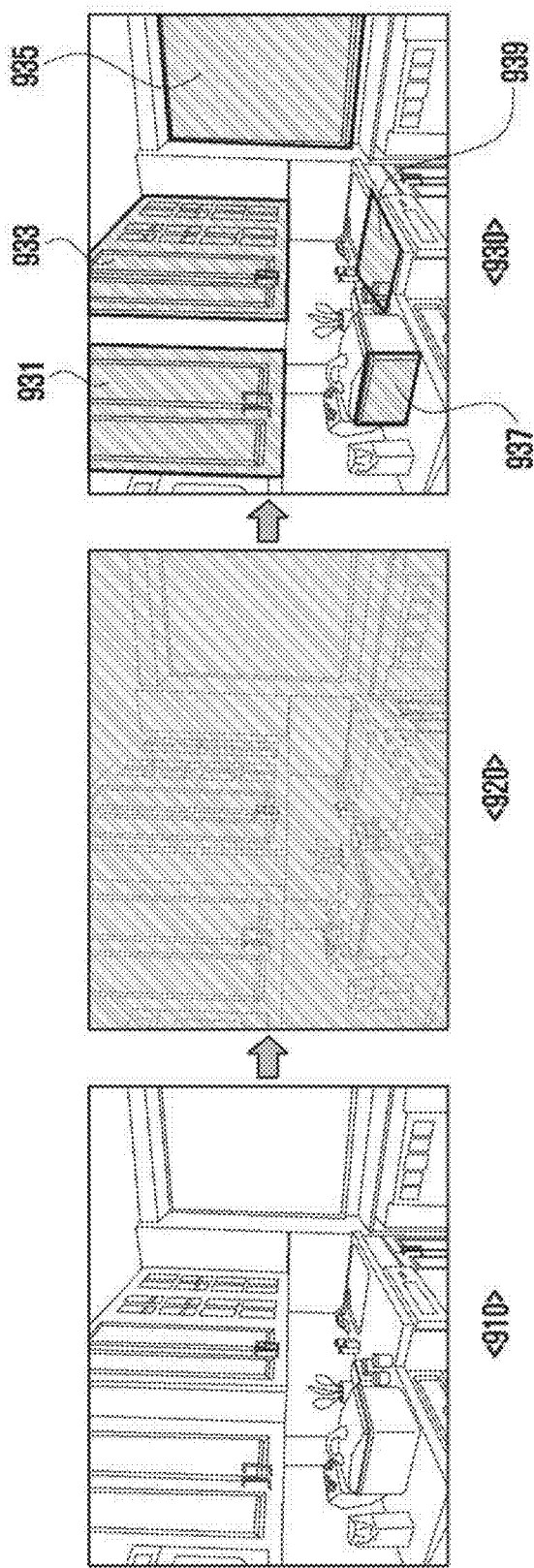
FIGS. 9A to 9B illustrate a method for storing a note associated with a specific space through augmented reality by an electronic device according to various embodiments of the disclosure.
Figure 9B:
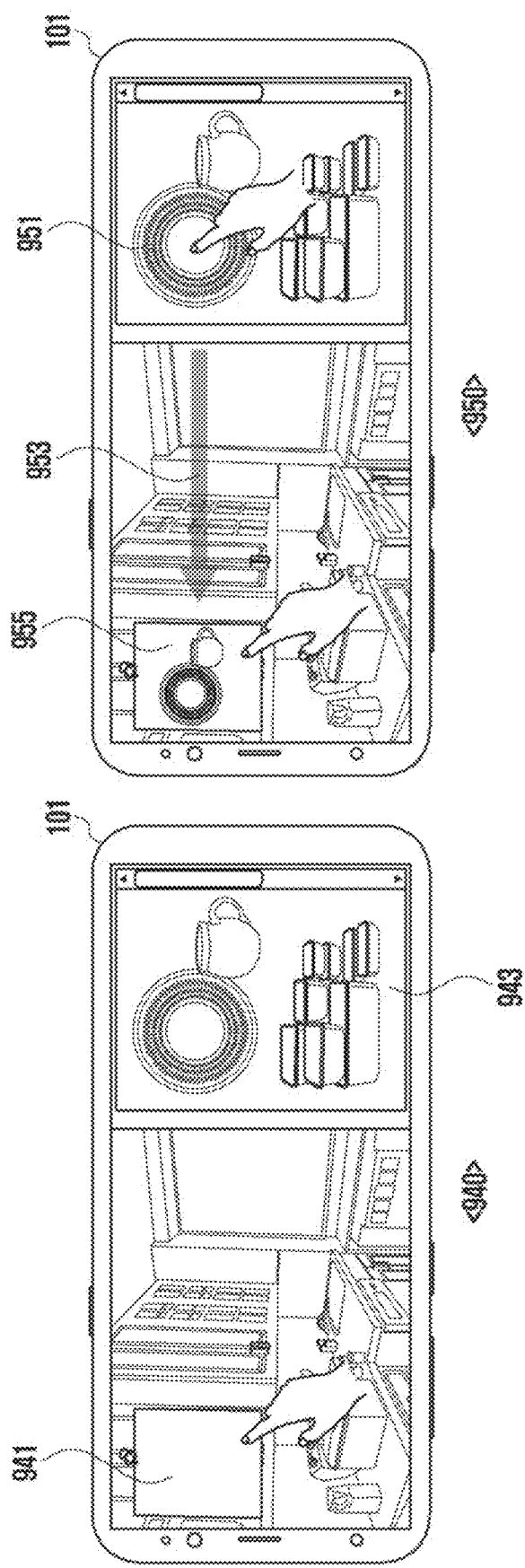

FIGS. 9A to 9B illustrate a method for storing a note associated with a specific space through augmented reality by an electronic device according to various embodiments of the disclosure.

According to various embodiments, referring to FIG. 9A, the electronic device 101 may acquire an image from the camera module 180. The electronic device 101 may measure the depth of objects included in the acquired image. In general, a depth camera may be used to measure the depth of objects, but in the electronic device 101 such as a smartphone, it may not be easy to have a separate depth camera due to miniaturization of a product. The electronic device 101 may extract only an RGB image 910 from image information to acquire a depth map 920, based on the extracted RGB image. Referring to reference numeral 930, the electronic device 101 may acquire plane information (e.g., reference numerals 931 to 939) existing in the image information, based on the acquired depth map 920. The electronic device 101 may use the acquired plane information to identify an area to which an augmented reality note can be attached.

According to various embodiments, referring to FIG. 9B, the electronic device 101 may execute an augmented reality note application with reference to reference numeral 940. A note available area 941 and a note content 943 (e.g., an object extracted from image information) may be displayed on a display of the electronic device 101. For example, the electronic device 101 may display the note available area 941 and the note content 943 together on one screen as shown in reference numeral 940. For another example, the electronic device 101 may independently display the note available area 941 or the note content 943 and then display the remaining items which are not displayed, according to a subsequent input of a user. If the note available area 941 is displayed first, in response to an input of the user selecting the note available area 941, the electronic device 101 may display the note content 943 corresponding to the corresponding area. If the note content 943 is displayed first, in response to an input of the user selecting the note content 943, the electronic device 101 may display the note available area 941 to display the corresponding note content.

Referring to reference numeral 950, in a state in which the note available area 941 and the note content 943 are displayed together, the electronic device 101 may receive, from the user, an input 953 for dragging a plate and cup 951 to a kitchen shelf area 955. In this case, an input for connecting the note available area 941 and the note content 943 is not limited to the drag input 953. The user may match the note content 943 and the note available area 941 through a tap touch input. Accordingly, the electronic device 101 may provide, to the user, an augmented reality note indicating that the plate and cup 951 are placed in the kitchen shelf area 955.

Figure 10:
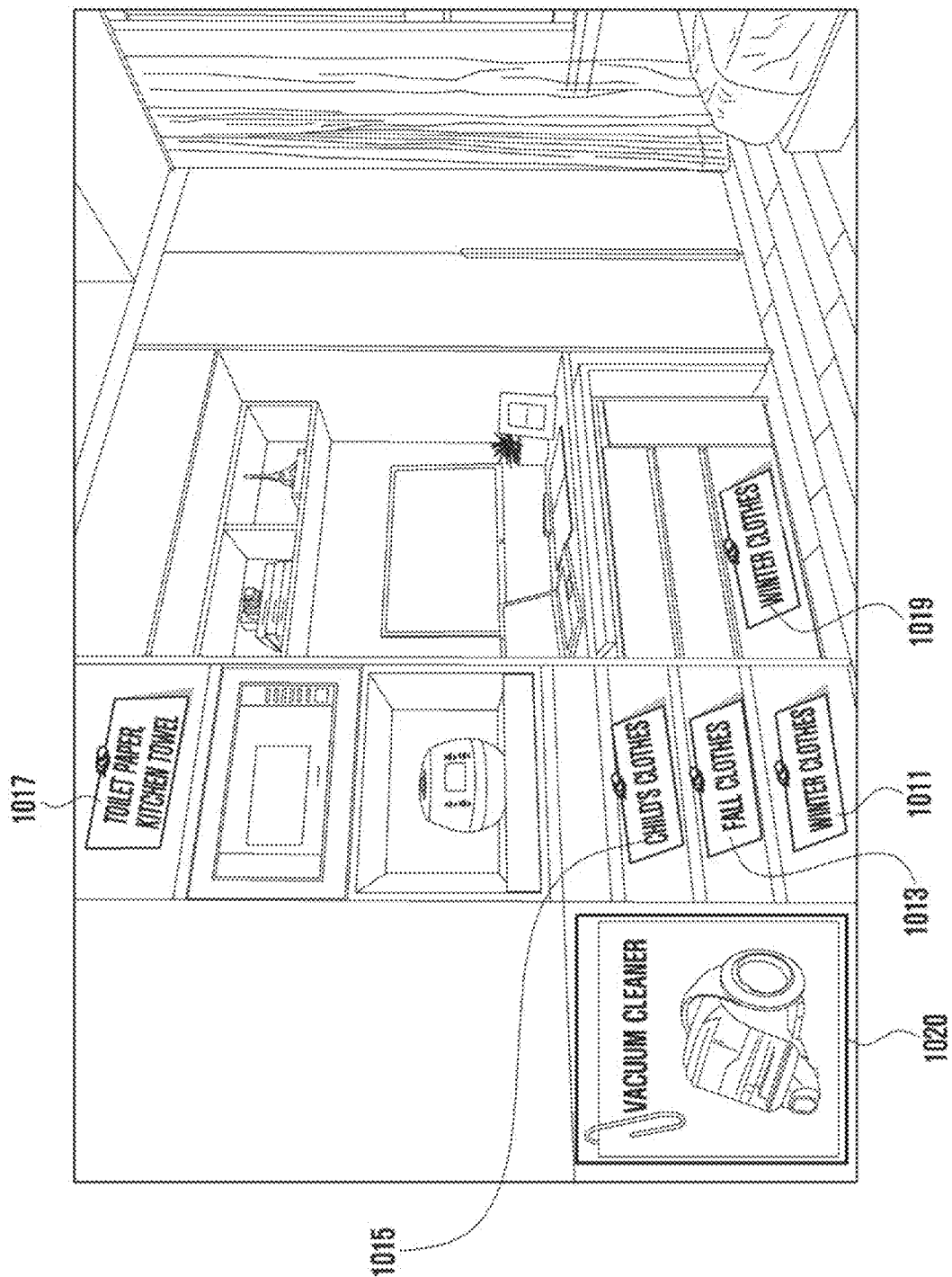
FIG. 10 illustrates a method for displaying a note made through augmented reality to a user by an electronic device according to various embodiments of the disclosure.

FIG. 10 illustrates a method for displaying a note made through augmented reality to a user by an electronic device according to various embodiments of the disclosure.

According to various embodiments, referring to FIG. 10, the electronic device 101 may provide at least one augmented reality note to a user. The electronic device 101 may store an augmented reality note by matching an area where an object is located with the object, through the note generation module 310, and provide the augmented reality note to the user. For example, the electronic device 101 may notify that winter clothes 1011 and 1019, fall clothes 1013, child's clothes 1015, toilet paper and kitchen towels 1017, and a vacuum cleaner 1020 are located in areas each having an augmented reality note attached thereto, respectively. The electronic device 101 may freely use a text, an emoticon, an image, a sound, or a vibration when storing an augmented reality note in combination with a specific area. For example, the electronic device 101 may configure so that not only a note paper is displayed but also a pre-designated image or melody is output, when the camera module faces the specific area.

Figure 11:
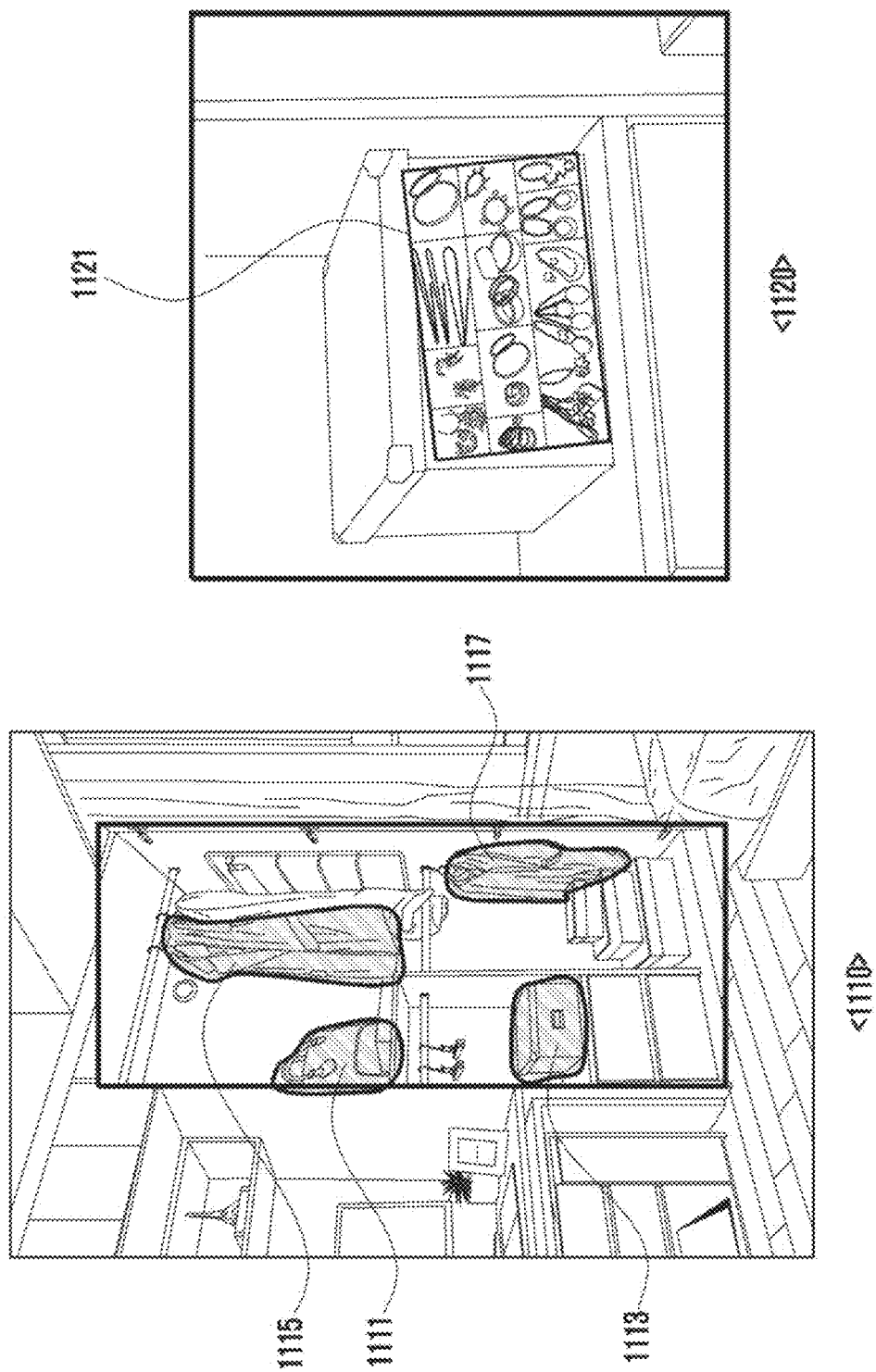
FIG. 11 illustrates a method for identifying a note through augmented reality by an electronic device according to various embodiments of the disclosure.

FIG. 11 illustrates a method for identifying a note in stages through augmented reality by an electronic device according to various embodiments of the disclosure.

According to various embodiments, referring to FIG. 11, the electronic device 101 may display an augmented reality note in a second stage (e.g., an image of a closet with a door closed, or a note of a text called a closet).

According to various embodiments, referring to reference numeral 1110, the electronic device 101 may display an augmented reality note in a third stage (e.g., images 1111 to 1117 of a closet with a door open, or text information relating to each object in a state where the closet door is open), in response to a user's input to enter a lower stage (e.g., a gesture of touching the closet or zooming in on the closet).

According to various embodiments, referring to reference numeral 1120, the electronic device 101 may display an augmented reality note in a fourth stage (e.g., an image 1121 of a storage box with a lid open, or text information relating to each object in a state where the lid is open), in response to a user's input to enter a lower stage (e.g., a gesture of touching the storage box or zooming in on the storage box). Accordingly, the user of the electronic device 101 can very easily and conveniently identify objects which are located inside, even when the user does not manually open the closet door or the storage box lid.

Figure 12:
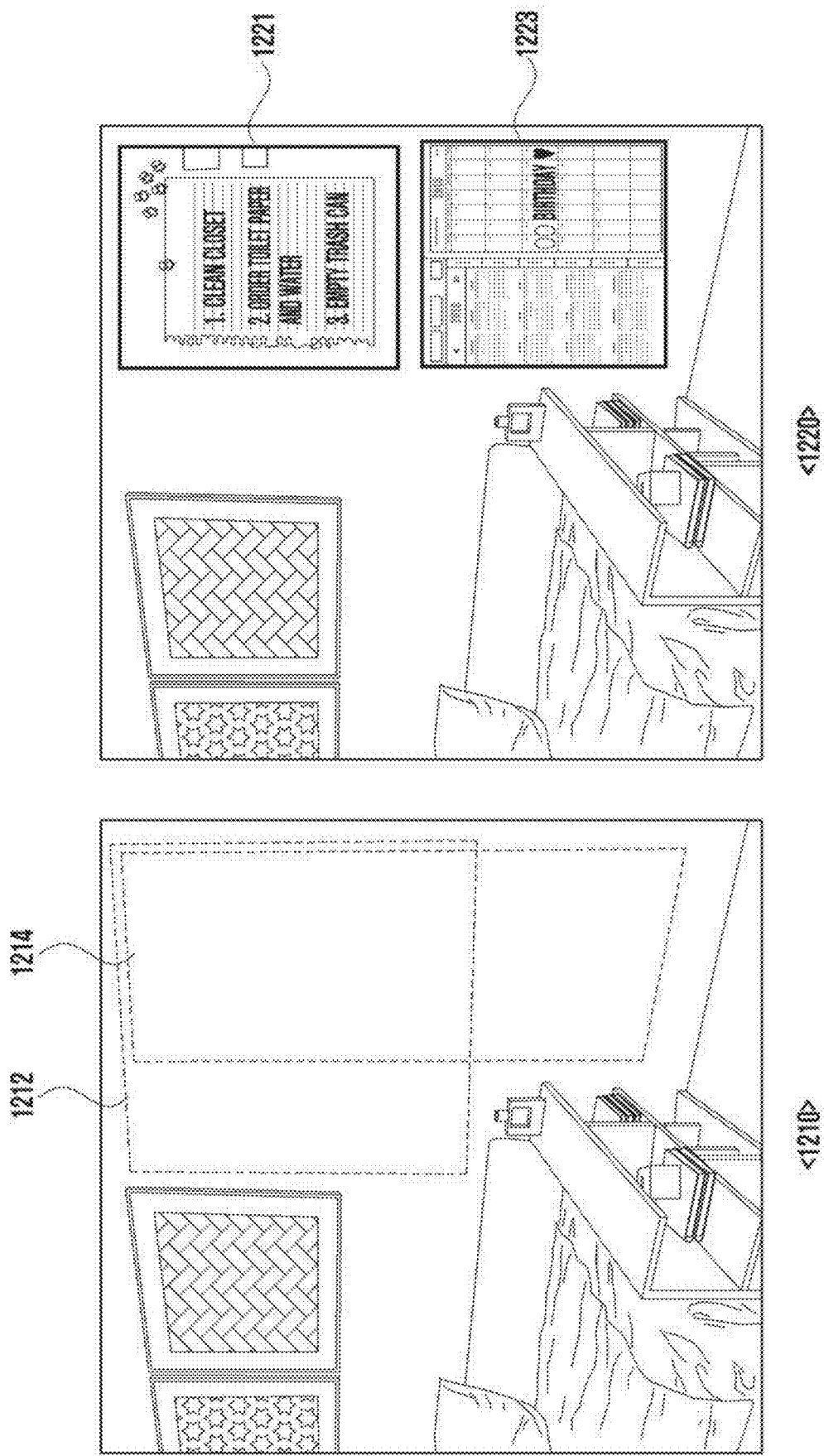
FIG. 12 illustrates a method for recognizing a note available area and providing a virtual note board to the corresponding area by an electronic device according to various embodiments of the disclosure.

FIG. 12 illustrates a method for recognizing a note available area and providing a virtual note board to the corresponding area by an electronic device according to various embodiments of the disclosure.

According to various embodiments, referring to reference numerals 1210 and 1220, the electronic device 101 may recognize a virtual area in which a note is to be displayed. For example, the electronic device 101 may acquire a depth map, and identify depth information of a background, based on the depth map. The electronic device 101 may acquire information on a plane on which an augmented reality note is to be displayed, based on the depth information. The electronic device 101 may determine the acquired plane information as note available areas 1212 and 1214, and provide virtual note boards 1221 and 1223 on the selected plane. The electronic device 101 may store and display the augmented reality note boards 1221 and 1223 in association with a specific space, even when the note is not object information obtained by analyzing an image. For example, the electronic device 101 may display a list of tasks to be performed by a user on the note board 1221 and display calendar and schedule information on the note board 1223. The user of the electronic device 101 may share the augmented reality note boards with a user of another electronic device. For example, the augmented reality note boards may be controlled to be visible only on an electronic device pre-designated by a user (e.g., an electronic device used by a family member) according to the setting of the user. In addition, the augmented reality note boards containing personal information may be identified only through the electronic device 101 of the user to increase security. Since such an augmented reality note board is a virtual image which does not exist in an actual background, it can be very useful in that the augmented reality note board maintains neatness and simplicity in appearance and allows a user to easily identify contents required to be necessarily remembered.

Figure 13:
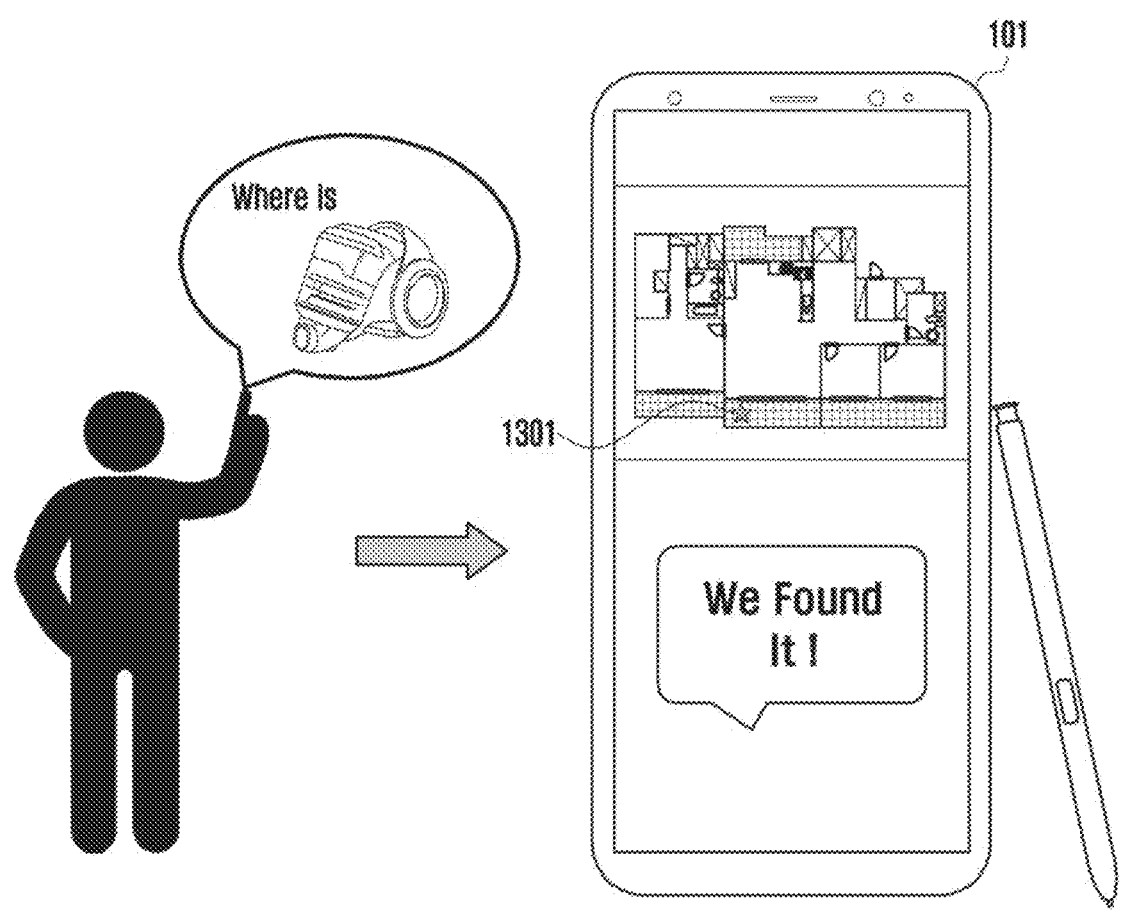
FIG. 13 illustrates a method for searching for a note centered on a user through an electronic device according to various embodiments of the disclosure.

FIG. 13 illustrates a method for searching for a note centered on a user through an electronic device according to various embodiments of the disclosure.

According to various embodiments, a user of the electronic device 101 may identify a made note at the user's current location even without manually moving to a space where the note is made. That is, the user of the electronic device 101 can easily identify the location of an object corresponding to a note made by the user from the user's viewpoint, wherever he/she is currently.

According to various embodiments, the electronic device 101 may receive, from the user, a voice input of requesting to identify where a vacuum cleaner is. For example, the electronic device 101 may receive a voice input of "Where is the vacuum cleaner?" from the user. In response to the user's voice input, the electronic device 101 may provide a response by hierarchically identifying the location of the vacuum cleaner stored in the note (e.g., house-balcony-vacuum cleaner). For example, the electronic device 101 may respond with "The vacuum cleaner is on the balcony". In addition, referring to FIG. 13, the electronic device 101 may display location information 1301 of the vacuum cleaner located on the balcony by using a house structure diagram. The house structure diagram may be stored in the memory 130 of the electronic device 101, or acquired through the electronic devices 102 and 104 or the server 108. If it is not possible to acquire the structure diagram corresponding to the house where the user is located, a house structure diagram may be generated by synthesizing at least one piece of information acquired from the camera module 180 of the electronic device 101 or other IoT devices in a smart home environment, and the location of the vacuum cleaner may be displayed on the generated structure diagram.

According to various embodiment, the device 101 may use a camera of an external electronic device (e.g., a mini robot, a TV, a security camera, etc.) to identify an augmented reality note located in the master bedroom even when the user is in the living room. The electronic device 101 may acquire image information from the camera of the external electronic device, in response to an input of the user. The electronic device 101 may provide, to the user, an augmented reality note associated with a specific space included in the corresponding image. Accordingly, the user of the electronic device 101 may identify the augmented reality note combined with a real background, even without manually moving. If the camera of the external electronic device cannot be used, the electronic device 101 may provide an augmented reality note or an image note to the user by using image information stored in the note providing system 300.

An electronic device according to various embodiments may include: a display; a camera module; and a processor, wherein the processor is configured to perform at least one of: acquiring a first image including at least one object disposed in a predetermined space, through the camera module; storing information on the at least one object to correspond to the predetermined space, based on the acquired first image; acquiring a second image including at least a part of the predetermined space, through the camera module; and based on the acquired second image, in a case of a first object included in the at least one object of the first image among an object included in the second image, displaying information on the first object together with the second image, through the display, and in a case of a second object which is not included in the at least one object of the first image among the object included in the second image, storing information on the second object to correspond to the predetermined space.

The information on the at least one object may include information obtained based on a voice input received from a user of the electronic device.

The information on the at least one object may include at least one of information on a space in which the at least one object is disposed, location information, category information, hierarchical information, and color information of the at least one object, and a user's input information related to the at least one object.

In a case of a third object which is not included in the second image among the at least one object of the first image, the processor may delete information on the third object, the information having been stored to correspond to the predetermined space, based on the acquired second image.

The processor may identify whether a permission from a user is obtained, when the information on the second object is stored to correspond to the predetermined space, or the information on the third object is deleted in correspondence with the predetermined space, and update the information on the second object or the third object, in response to receiving a confirmation from the user.

The processor may update the information on the second object or the third object when the information on the second object is stored to correspond to the predetermined space, or the information on the third object is deleted in correspondence with the predetermined space, and provide update information relating to the second object or the third object to the user.

The processor may recognize a plurality of objects placed in the predetermined space, through the camera module, and generate hierarchy information of the plurality of objects, wherein the hierarchy information includes information in which the plurality of objects are classified as a first layer, or information in which the plurality of objects are classified as the first layer and a second layer different from the first layer.

The processor may recognize an object corresponding to the first layer and an object corresponding to the second layer at different times, through the camera module.

The processor may receive a layer change input from a user while displaying information on the object corresponding to the first layer together with the second image, through the display, and in response to receiving the layer change input, display information on the object corresponding to the second layer in place of the information on the object corresponding to the first layer, wherein the layer change input includes at least one of a voice input of the user, a gesture input of the user, and a touch input of the user associated with the information on the object corresponding to the first layer.

The information on the object corresponding to the first layer or the second layer may include at least one of information on an object with a high use frequency among at least one object classified as the first layer or the second layer, information on an object with a high search frequency among the at least one object classified as the first layer or the second layer, and thumbnail information relating to the at least one object classified as the first layer or the second layer.

A method of an electronic device according to various embodiments may include performing at least one of: acquiring a first image including at least one object disposed in a predetermined space, through a camera module of the electronic device; storing information on the at least one object to correspond to the predetermined space, based on the acquired first image; acquiring a second image including at least a part of the predetermined space, through the camera module; and based on the acquired second image, in a case of a first object included in the at least one object of the first image among an object included in the second image, displaying information on the first object together with the second image, through the display, and in a case of a second object which is not included in the at least one object of the first image among the object included in the second image, storing information on the second object to correspond to the predetermined space.

The information on the at least one object may include information obtained based on a voice input received from a user of the electronic device.

The information on the at least one object may include at least one of information on a space in which the at least one object is disposed, location information, category information, hierarchical information, and color information of the at least one object, and a user's input information related to the at least one object.

The method may further include, based on the acquired second image, in a case of a third object which is not included in the second image among the at least one object of the first image, deleting information on the third object, the information having been stored to correspond to the predetermined space.

The method may further include: identifying whether a permission from a user is obtained, when the storing of the information on the second object to correspond to the predetermined space, or the deleting of the information on the third object in correspondence with the predetermined space is performed; and updating the information on the second object or the third object, in response to receiving a confirmation from the user.

The method may further include: updating the information on the second object or the third object when the storing of the information on the second object to correspond to the predetermined space, or the deleting of the information on the third object in correspondence with the predetermined space is performed; and providing update information relating to the second object or the third object to the user.

The method may further include: recognizing a plurality of objects placed in the predetermined space, through the camera module; and generating hierarchy information of the plurality of objects, wherein the hierarchy information includes information in which the plurality of objects are classified as a first layer, or information in which the plurality of objects are classified as the first layer and a second layer different from the first layer.

The method may further include recognizing an object corresponding to the first layer and an object corresponding to the second layer at different times, through the camera module.

The method may further include: receiving a layer change input from a user while displaying information on the object corresponding to the first layer together with the second image, through the display; and in response to receiving the layer change input, displaying information on the object corresponding to the second layer in place of the information on the object corresponding to the first layer, wherein the layer change input includes at least one of a voice input of the user, a gesture input of the user, and a touch input of the user associated with the information on the object corresponding to the first layer.

The information on the object corresponding to the first layer or the second layer may include at least one of information on an object with a high use frequency among at least one object classified as the first layer or the second layer, information on an object with a high search frequency among the at least one object classified as the first layer or the second layer, and thumbnail information relating to the at least one object classified as the first layer or the second layer.

The invention claimed is:

1. An electronic device comprising:
a display;
a camera module; and
a processor,
wherein the processor is configured to perform at least one of:
acquiring a first image including at least one object disposed in a predetermined space, through the camera module;
recognizing a plurality of objects placed in the predetermined space, through the camera module;
generating hierarchy information of the plurality of objects;
storing information including the hierarchy information on the at least one object to correspond to the predetermined space, based on the acquired first image;
acquiring a second image including at least a part of the predetermined space, through the camera module;
based on the acquired second image;
in a case of a first object included in the at least one object of the first image among an object included in the second image, displaying information on the first object together with the second image, through the display, and
in a case of a second object which is not included in the at least one object of the first image among the object included in the second image, storing information on the second object to correspond to the predetermined space;
receiving a layer change input from a user while displaying information on the object corresponding to a first layer together with the second image, through the display; and
in response to receiving the layer change input, displaying information on the object corresponding to a second layer in place of the information on the object corresponding to the first layer,
wherein the layer change input comprises at least one of a voice input of the user, a gesture input of the user, and a touch input of the user associated with the information on the object corresponding to the first layer, and
wherein the hierarchy information comprises information in which the plurality of objects are classified as the first layer, or information in which the plurality of objects are classified as the first layer and the second layer different from the first layer.

2. The electronic device of claim 1, wherein the information on the at least one object comprises information obtained based on a voice input received from a user of the electronic device.

3. The electronic device of claim 1, wherein the information on the at least one object comprises at least one of information on a space in which the at least one object is disposed, location information, category information, the hierarchy information, and color information of the at least one object, and a user's input information related to the at least one object.

4. The electronic device of claim 1, wherein the processor is configured to, based on the acquired second image, in a case of a third object which is not included in the second image among the at least one object of the first image, delete information on the third object, the information having been stored to correspond to the predetermined space.

5. The electronic device of claim 4, wherein the processor is configured to:
identify whether a permission from a user is obtained, when the information on the second object is stored to correspond to the predetermined space, or the information on the third object is deleted in correspondence with the predetermined space; and
update the information on the second object or the third object, in response to receiving a confirmation from the user.

6. The electronic device of claim 4, wherein the processor is configured to:
update the information on the second object or the third object when the information on the second object is stored to correspond to the predetermined space, or the information on the third object is deleted in correspondence with the predetermined space; and
provide update information relating to the second object or the third object to a user.

7. The electronic device of claim 1, wherein the processor is configured to recognize an object corresponding to the first layer and an object corresponding to the second layer at different times, through the camera module.

8. The electronic device of claim 1, wherein the information on the object corresponding to the first layer or the second layer comprises at least one of:
- information on an object with a high use frequency among at least one object classified as the first layer or the second layer;
- information on an object with a high search frequency among the at least one object classified as the first layer or the second layer; and
- thumbnail information relating to the at least one object classified as the first layer or the second layer.

9. A method of an electronic device, the method comprising performing at least one of:
- acquiring a first image including at least one object disposed in a predetermined space, through a camera module of the electronic device;
- recognizing a plurality of objects placed in the predetermined space, through the camera module;
- generating hierarchy information of the plurality of objects;
- storing information on the at least one object to correspond to the predetermined space, based on the acquired first image;
- acquiring a second image including at least a part of the predetermined space, through the camera module;
- based on the acquired second image;
  - in a case of a first object included in the at least one object of the first image among an object included in the second image, displaying information on the first object together with the second image, through the display, and
  - in a case of a second object which is not included in the at least one object of the first image among the object included in the second image, storing information on the second object to correspond to the predetermined space;
- receiving a layer change input from a user while displaying information on the object corresponding to a first layer together with the second image, through the display; and
- in response to receiving the layer change input, displaying information on the object corresponding to a second layer in place of the information on the object corresponding to the first layer, wherein the layer change input comprises at least one of a voice input of the user, a gesture input of the user, and a touch input of the user associated with the information on the object corresponding to the first layer, and wherein the hierarchy information comprises information in which the plurality of objects are classified as the first layer, or information in which the plurality of objects are classified as the first layer and the second layer different from the first layer.

10. The method of claim 9, wherein the information on the at least one object comprises information obtained based on a voice input received from a user of the electronic device.

11. The method of claim 9, wherein the information on the at least one object comprises at least one of information on a space in which the at least one object is disposed, location information, category information, the hierarchy information, and color information of the at least one object, and a user's input information related to the at least one object.

12. The method of claim 9, further comprising based on the acquired second image, in a case of a third object which is not included in the second image among the at least one object of the first image, deleting information on the third object, the information having been stored to correspond to the predetermined space.

13. The method of claim 12, further comprising:
- identifying whether a permission from a user is obtained, when the storing of the information on the second object to correspond to the predetermined space, or the deleting of the information on the third object in correspondence with the predetermined space is performed; and
- updating the information on the second object or the third object, in response to receiving a confirmation from the user.

* * * * *